United States Patent
Ikeda et al.

(10) Patent No.: US 7,818,985 B2
(45) Date of Patent: Oct. 26, 2010

(54) BENDING APPARATUS

(75) Inventors: Hidekatsu Ikeda, Kanagawa (JP);
Takanori Okubo, Kanagawa (JP);
Kazuhiro Kanno, Kanagawa (JP);
Hisashi Uto, Kanagawa (JP)

(73) Assignee: Amada Company, Ltd., Kanagawa (JP)

( * ) Notice: Subject to any disclaimer, the term of this patent is extended or adjusted under 35 U.S.C. 154(b) by 744 days.

(21) Appl. No.: 10/599,706

(22) PCT Filed: Mar. 28, 2005

(86) PCT No.: PCT/JP2005/006533
§ 371 (c)(1),
(2), (4) Date: Jul. 6, 2007

(87) PCT Pub. No.: WO2005/097370
PCT Pub. Date: Oct. 20, 2005

(65) Prior Publication Data
US 2009/0024246 A1 Jan. 22, 2009

(30) Foreign Application Priority Data
Apr. 6, 2004 (JP) ............................ 2004-111747
Feb. 28, 2005 (JP) ............................ 2005-052287

(51) Int. Cl.
*B21D 5/01* (2006.01)
*B30B 15/00* (2006.01)

(52) U.S. Cl. .................. 72/20.2; 72/31.1; 72/31.11; 72/389.3; 72/389.6; 72/446; 100/257; 29/753

(58) Field of Classification Search ................ 72/19.1, 72/20.1, 31.01, 31.1, 31.11, 105, 106, 389.1, 72/389.3, 389.4, 389.5, 389.6, 446, 702; 100/257; 29/753; 364/476
See application file for complete search history.

(56) References Cited

U.S. PATENT DOCUMENTS

| 4,074,350 | A | * | 2/1978 | Roch et al. ............... 72/31.01 |
| 4,166,370 | A | * | 9/1979 | Goodman ................. 72/105 |
| 4,170,134 | A | * | 10/1979 | Nathan ..................... 73/182 |
| 4,831,862 | A | * | 5/1989 | Ohashi et al. ............. 72/389.3 |
| 7,007,530 | B2 | | 3/2006 | Koyama et al. |
| 2006/0162408 | A1 | | 7/2006 | Niwa et al. |

FOREIGN PATENT DOCUMENTS

| JP | 9-295057 | 11/1997 |
| JP | 2000-351018 | 12/2000 |
| JP | 2004-058070 | 2/2004 |

OTHER PUBLICATIONS

English Language Abstract of JP 2000-351018.
English Language Abstract of JP 2004-058070.
English Language Abstract of JP 9-295057.

* cited by examiner

*Primary Examiner*—David B Jones
(74) *Attorney, Agent, or Firm*—Greenblum & Bernstein, P.L.C.

(57) ABSTRACT

A bending apparatus is provided with a ram start-up device so as to be movable in a lateral direction. A controller moves the ram start-up device to a point in front of positioning points of abutments corresponding to points of selected edges of a workpiece. The bending apparatus includes a foreign object detector that detects the entry of a foreign object into a region of movement of the ram start-up device. A controller prevents the ram start-up device from moving when the entry of the foreign object is detected.

17 Claims, 18 Drawing Sheets

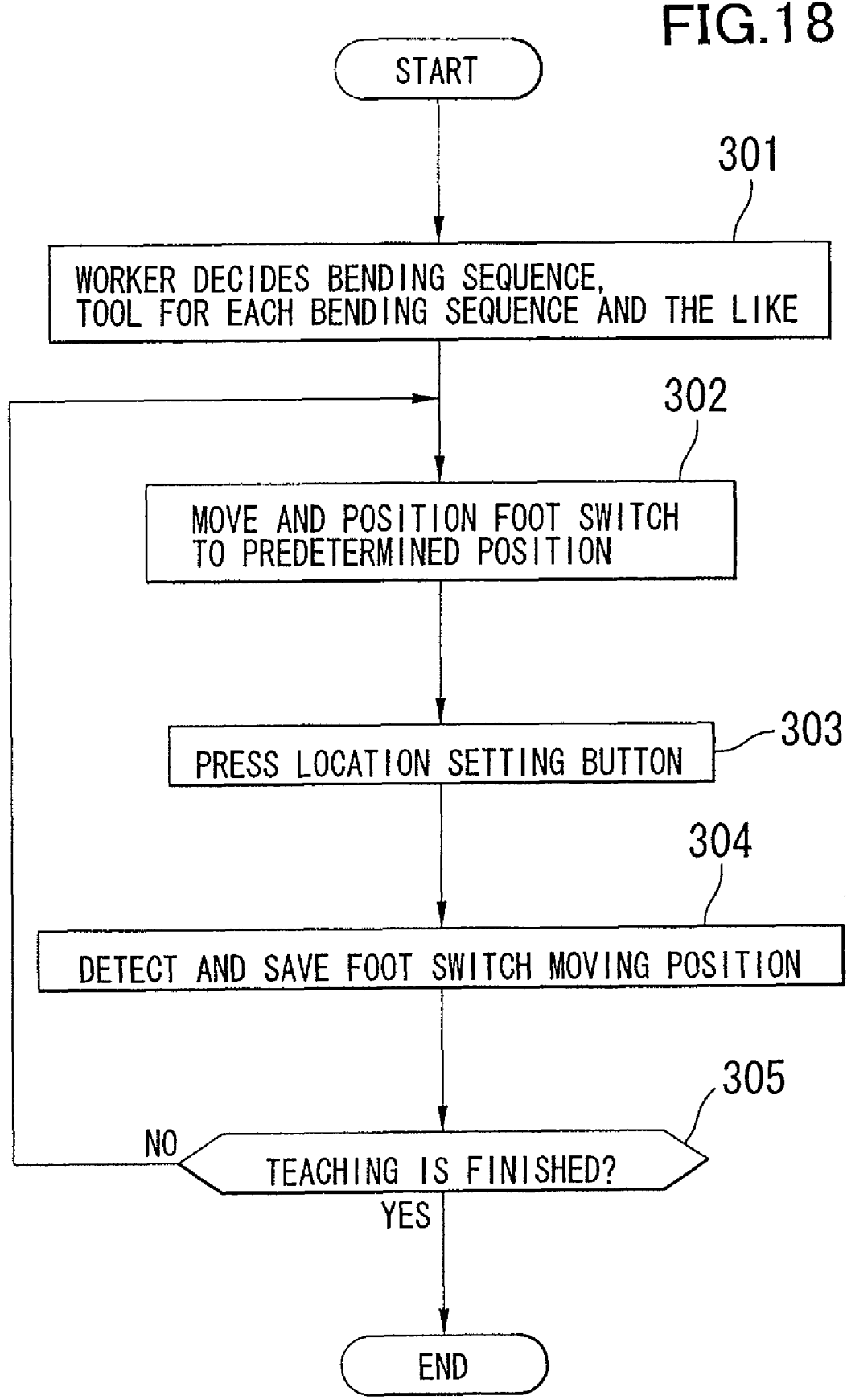

BENDING APPARATUS

TECHNICAL FIELD

The present invention relates to a bending apparatus having a foot switch capable of moving to a point in front of a positioning point of a workpiece at each bending sequence in step bending.

BACKGROUND ART

Hitherto, according to a bending apparatus such as a press brake, a line to be bent is successively selected based on product information to determine a bending sequence (manually or automatically), tools including a punch attached to an upper table and/or a die attached to a lower table, and a tool (processing station) at each bending sequence. The predetermined tools are put at predetermined positions on upper and lower tables based on the determined tool layout, then the foot switch is turned on to start up a ram on the upper or lower table, and a workpiece is bent.

In a bending apparatus like that, recently, such a step bending has become mainstream that multiple processing stations are provided and a worker moves to a predetermined processing station at each bending sequence so that multiple processing steps can be performed as products have been complicated.

With respect to the step bending, for example, as disclosed in Japanese Patent Application Laid-Open No. 9-295057 and No. 2000-351018, a foot switch is moveable to a point in front of a predetermined processing station at each bending sequence, or to a point in front of a center point C of back-ends of a workpiece against which abutments are abutted (FIG. 3 in Japanese Patent Application Laid-Open No. 9-295057), whereby the burden of workers is reduced.

In the step bending process, however, there are cases where bending lines on the workpiece, which is an object to be processed, are present on an end part in the left-right direction of the workpiece. In such a case, even if the foot switch can be moved in front of the processing station or in front of the center point of the back-ends of the workpiece, as mentioned above, a distance between an actual processing point (an end part in the left-right direction of the workpiece) and the foot switch is long.

As a result, workers have to have an improper posture and it is very difficult to work, and accordingly the work efficiency is apparently lowered. Further, a workpiece abutting accuracy expressing a degree of contact properness between the workpiece and the abutment is lowered, and accurate flange sizes cannot be obtained.

On the other hand, according to the conventional technique, when after one step (a bending) is finished, a foot switch starts moving toward a target, a next processing station. At that time a worker sometimes keeps his/her foot on the foot switch, and also, such a case may happen that a body part of the worker enters the region of movement while the foot switch is moving.

As a result, the worker faces a very big danger, the safety is not ensured, and a big accident sometimes occurs.

The object of the present invention is to provide a bending apparatus capable of improving the work efficiency by providing a moveable foot switch to a point in front of an actual bending point as well as ensuring the safety of workers by preventing the foot switch from moving when a foreign object including a body part of the worker is present in a region of movement of the foot switch, or by detecting the entry of the foreign object and emergently stopping the foot switch when the foreign object enters the region of movement even after the foot switch has once started moving.

DISCLOSURE OF THE INVENTION

In order to solve the above-mentioned problems, the present invention provides:

a bending apparatus 1 comprising ram start-up device 2 (FIG. 1) provided so as to be movable in the left-right direction, and control part 20E that among edges constituting a workpiece W, selects edges owing to which the positioning and processing operations of said workpiece are more stable in the case of abutting the edges against abutments 10 and 11, based on a shape of it at each bending sequence, and that moves the ram start-up device 2 to a point in front of positioning points of the abutments 10 and 11 corresponding to points of said selected edges;

a bending apparatus 1 comprising ram start-up device 2 provided so as to be movable in the left-right direction, foreign object detecting device 8 and 9 that detects the entry of a foreign object into a region of movement of the ram start-up device 2, and control part 20E that prevents the ram start-up device 2 from moving when the entry of the foreign object is detected;

a bending apparatus 1 comprising ram start-up device 2 (FIG. 12) provided so as to be movable in the left-right direction, an input part 21B that inputs product information, a bending sequence determining part 21C that determines a bending sequence of a workpiece W based on the product information, a tool determining part 21D that determines tools including a punch P and a die D which bend the workpiece W and a tool layout at each bending sequence, an abutment point determining part 30F that determines points $X_1$ and $X_2$ of abutments 10 and 11 in the left-right direction based on the bending sequence, the tools and the tool layout, and a ram start-up device point determining part 30G that pre-determines a point X of the ram start-up device 2 in the left-right direction in a range of an abutting width A or B procured from one or more of the abutments 10 and 11 based on the determined points of the abutments 10 and 11 in the left-right direction, and that when the ram start-up device 2 actually moves to a point different from the pre-determined point, determines the actual moving point as a final point of the ram start-up device; and a bending apparatus 1 comprising ram start-up device 2 provided so as to be movable in the left-right direction, an abutment point determining part 30F that determines points $X_1$ and $X_2$ of abutments 10 and 11 in the left-right direction based on the determined bending sequence, tools and a tool layout decided by a worker S according to product information, and a ram start-up device point determining part 30G that determines a point where the ram start-up device is actually positioned as a point X of the ram start-up device 2 in the right-left direction in a range of an abutting width A or B procured from one or more of the abutments 10 and 11 based on the points $X_1$ and $X_2$ of the abutments 10 and 11 in the right-left direction.

According to an aspect of the present disclosure, if, for example, the ram start-up device 2 (FIG. 1) is composed of a foot switch, the foot switch 2 moves to the point in front of the positioning point X of the workpiece, which is an actual processing point, at each bending sequence, and, therefore, a distance between the foot switch 2 and the actual processing point is very short, whereby after positioning the workpiece W at the actual processing point, a worker S can steps on the foot switch 2 to start-up the ram 12 and process the workpiece W, which leads to easy work for the worker S and improved work efficiency.

Further, according to an aspect of the present disclosure, if, for example, the foreign object determining device is composed of an area sensor containing a light receiving element 9 and a light emitter 8 (FIG. 1), when the foreign object such as a body part of a worker, a workpiece W or an implement enters the region R of movement of the foot switch (FIG. 2), a ray of light L from the light emitter 8 is blocked and the area sensor is turned on (NO in Step 105 in FIG. 11), and then the foot switch 2 cannot move, or when the foreign object enters the region while the foot switch 2 is moving (Step 106⇒NO in Step 107 in FIG. 11), similar to the above, the ray of light L from the light emitter 8 is blocked and the area sensor is in ON mode (NO in Step 113 in FIG. 11), and then the foot switch 2 is emergently stopped (Step 114 in FIG. 11), whereby the worker is prevented from danger and the safety of the worker is ensured.

Still further, according to an aspect of the present disclosure, in a bending trial (FIG. 12 to FIG. 15), a worker moves the foot switch 2 to a point at which he/she easily turns on the switch, positions the foot switch there (Step 204 in FIG. 15), and abuts the workpiece W (Step 205 in FIG. 15), and subsequently the foot switch 2 is turned on to move a ram 12 down (Step 206 in FIG. 15). In that case, if a point X' at which the foot switch is turned on and an original target point X are different from each other (YES in Step 207 in FIG. 15), the new target value X' can be used in the following bending steps by changing the original target value X to X' (Step 208 in FIG. 15), and thus it is easy for the worker to work and the work efficiency is further improved. According to an aspect of the present disclosure, since a manual setting mode (teaching method) by the worker can become available (FIG. 16 to FIG. 18), the work efficiency can be further improved, in this point.

As mentioned above, the present invention can provide a bending apparatus capable of improving the work efficiency by providing a movable foot switch in front of the actual bending point, and ensuring the safety of workers by preventing the foot switch from moving when the foreign object including the body part of the worker is present in the region of movement of the foot switch, or by detecting the foreign object and emergently stopping the foot switch when the foreign object enters the region of movement even after the foot switch has once started moving.

Furthermore, according to the present invention, it is not necessary for a worker to keep an improper posture for a long period of time by providing the foot switch movable to the point in front of the actual bending point, and thus the invention can provide a bending apparatus with improved working efficiency in this point as well.

BRIEF DESCRIPTION OF THE DRAWINGS

FIG. 18 is a flow chart explaining operation in FIG. 16.

BEST MODES FOR CARRYING OUT THE INVENTION

Now, the present invention will be described by means of embodiments, with reference to the accompanying drawings.

Figure 1:
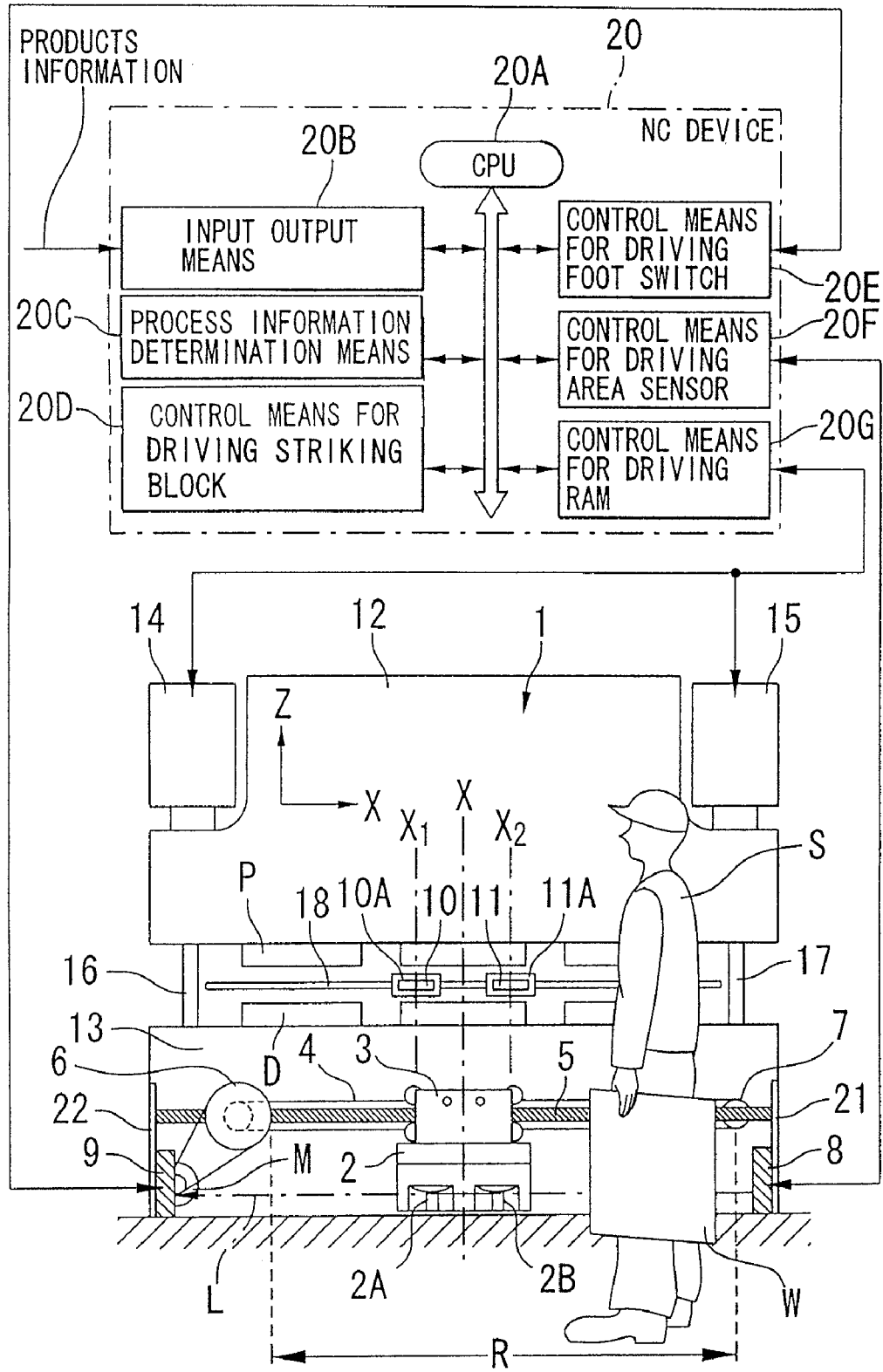
FIG. 1 is an overall view of the present invention.

FIG. 1 is the overall view of the present invention.

A bending apparatus 1 shown in FIG. 1 may be, for example, a press brake. This press brake 1 has side plates 16 and 17 on the both sides of the machine body, and has an upper table 12 mounted on upper parts of the side plates 16 and 17 through a ram-driving source such as hydraulic cylinders 14 and 15. To the upper table 12 is attached a punch P.

A lower table 13 is placed under the side plates 16 and 17, and a die D is attached to the table 13.

That is, the bending apparatus 1 shown in FIG. 1 is a lifting-down type press brake; and after a workpiece W is positioned by abutting it against abutments 10 and 11 in a back gauge described later, which are placed behind the lower table 13, hydraulic cylinders 14 and 15 are activated by turning on a foot switch 2 described later, which is placed forward a positioning point X of the workpiece, to move the upper table 12 down, whereby the workpiece W is bent by the co-operation of the punch P and the die D (YES in Step 109⇒Step 110⇒YES in Step 111 in FIG. 11).

The back gauge having the abutments 10 and 11 is provided behind the lower table 13 (FIG. 1), and are supported by, for example, the lower table 13 through link mechanism (not shown).

A stretch 18 is provided in the left-right direction (X-direction) between the link mechanisms on both sides of the lower table 13; and abutment bodies 10A (FIG. 5) and 11A having the abutments 10 and 11 are mounted on a front section of the stretch 18, which are moveable in the left-right direction by an X-axis motor Mx. Further, the link mechanism is moveable in the front-back direction (Y-direction) by a Y-axis motor My (not shown) and in the up-down direction (Z-direction) by a Z-axis motor Mz (not shown).

By using this structure, the abutments 10 and 11 are positioned at predetermined points by control part 20D for driving the abutments (FIG. 1). The foot switch 2 is positioned through the foot switch drive control part 20E at a positioning point X of a workpiece, that is an intermediate point between the points $X_1$ and $X_2$, $X=(X_1+X_2)/2$, for example, among the positions in the left-right direction (X-direction) (FIG. 5 to FIG. 8).

The foot switch 2, which is a ram start-up device, is placed forward the lower end of the lower table 13 (FIG. 1) so as to movable in the left-right direction.

Figure 10:
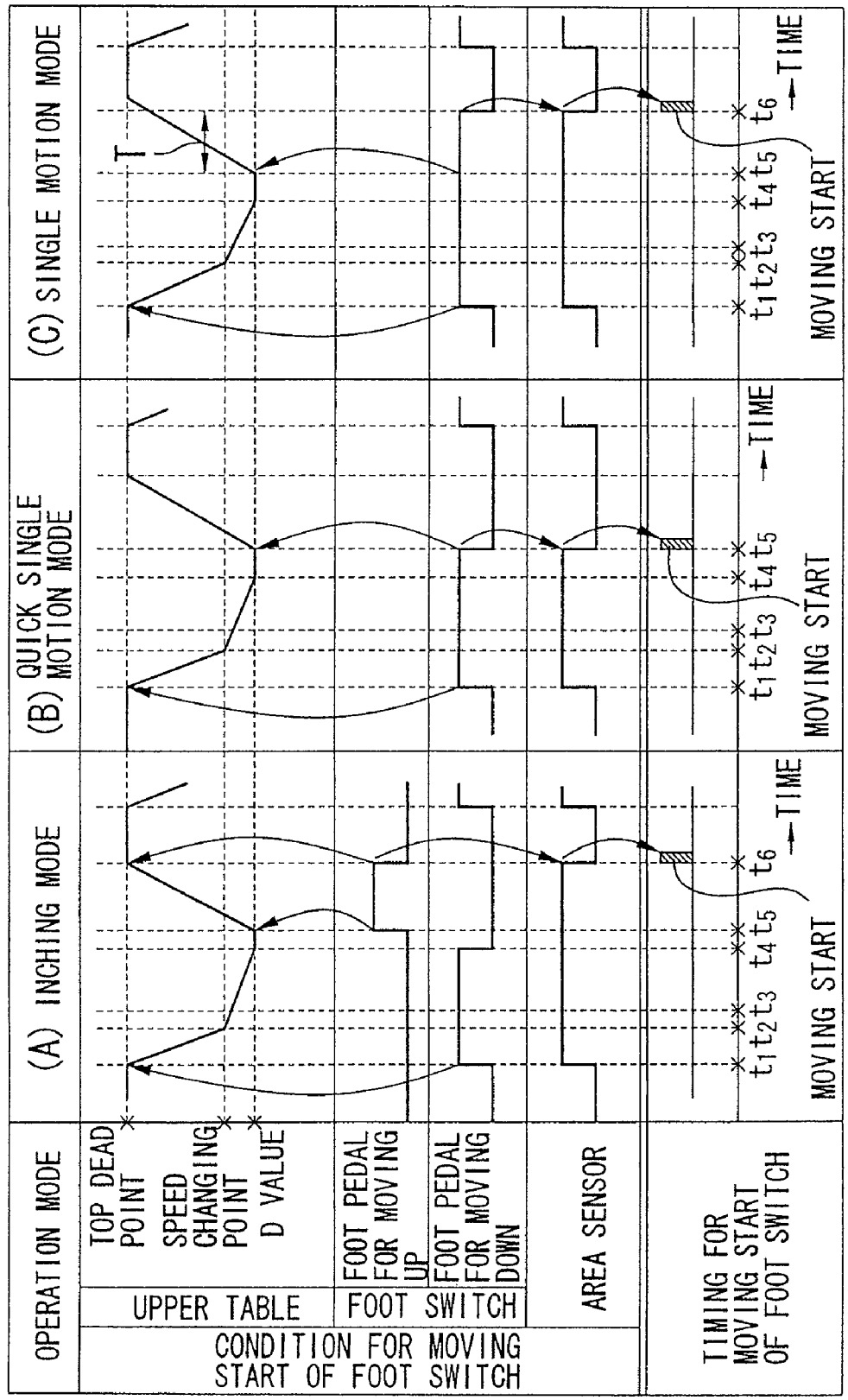
FIG. 10 is a drawing showing a relationship between conditions of start of moving and timing of start of moving of the foot switch 2 according to the present invention.

This foot switch 2, as well-known, contains a foot pedal 2A for moving up and a foot pedal 2B for moving down, and the upper table 12 or the ram can be moved up or down when a worker S steps on the pedal 2A or 2B with his/her foot (FIG. 10).

Figure 3:
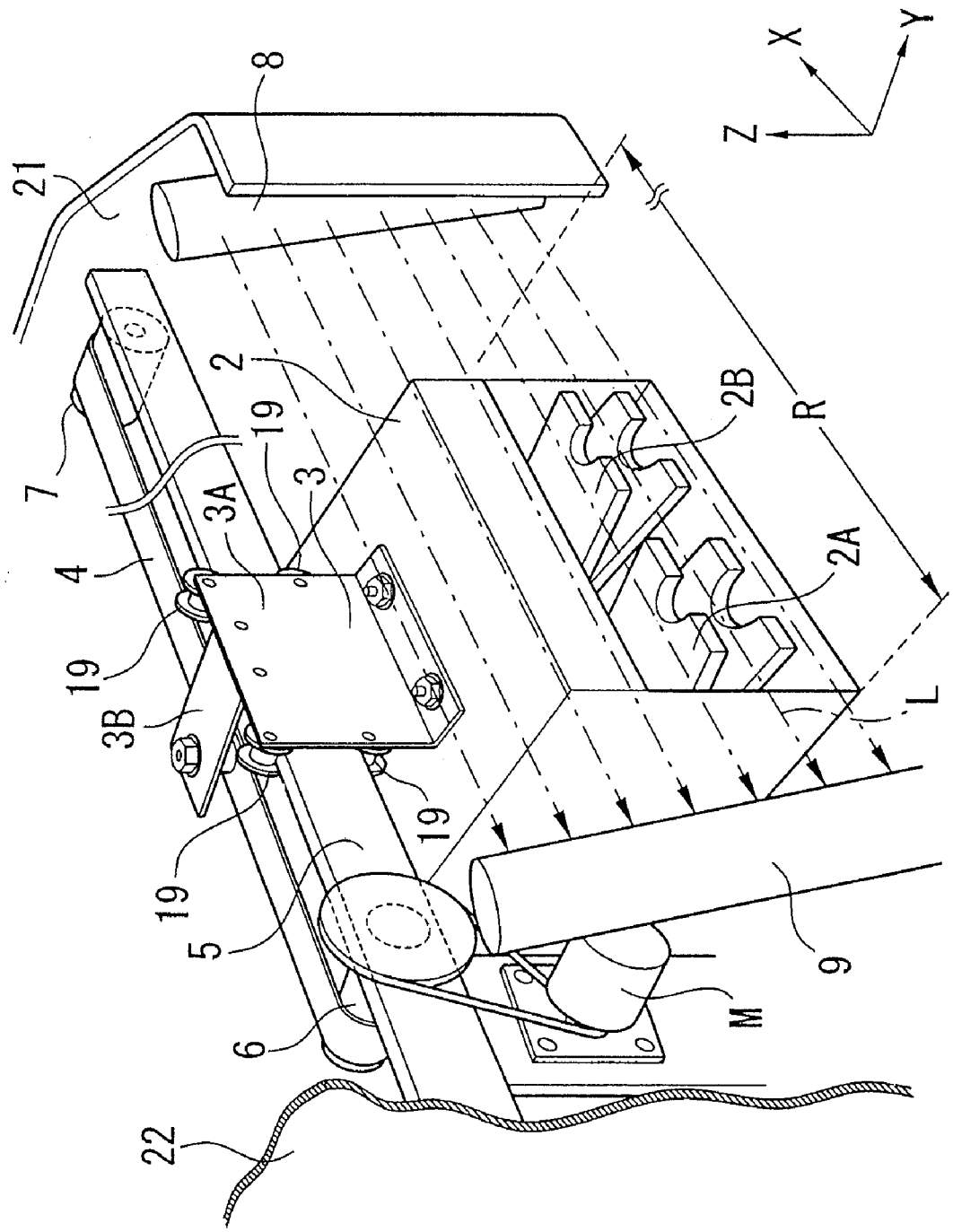
FIG. 3 is a front view of a foot switch 2 constituting the present invention.
Figure 4:
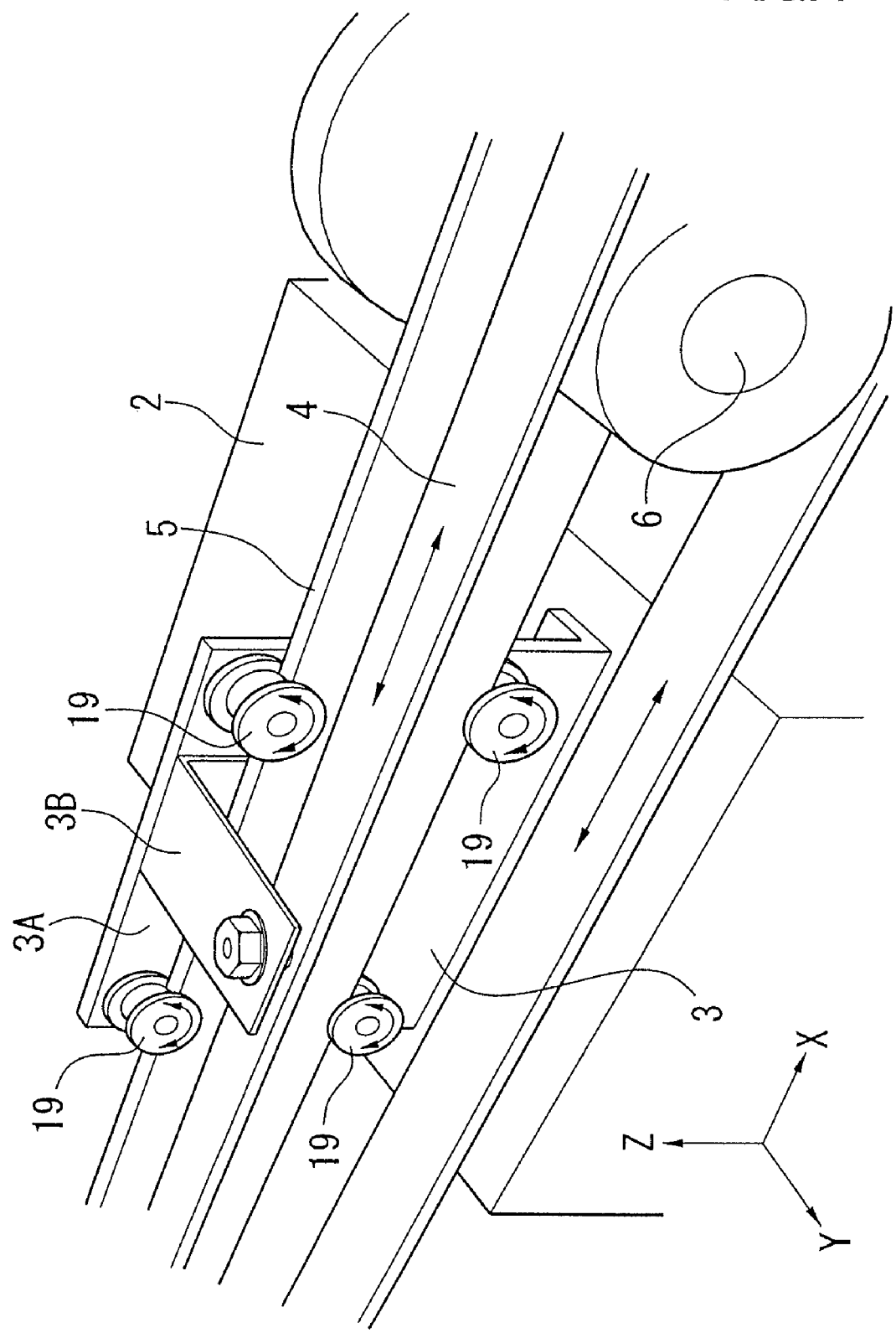
FIG. 4 is a back view of the foot switch 2 constituting the present invention.

The foot switch 2 (FIG. 1) has a mounting member 3; and rollers 19 are rotatably attached to four corners of a rectangular vertical plate 3A (FIG. 3 and FIG. 4) of the mounting member 3. The rollers 19 are each slidably attached to a top surface or a bottom surface of a guide 5 extending in the left-right direction, mounted on the machine body side.

Figure 2:
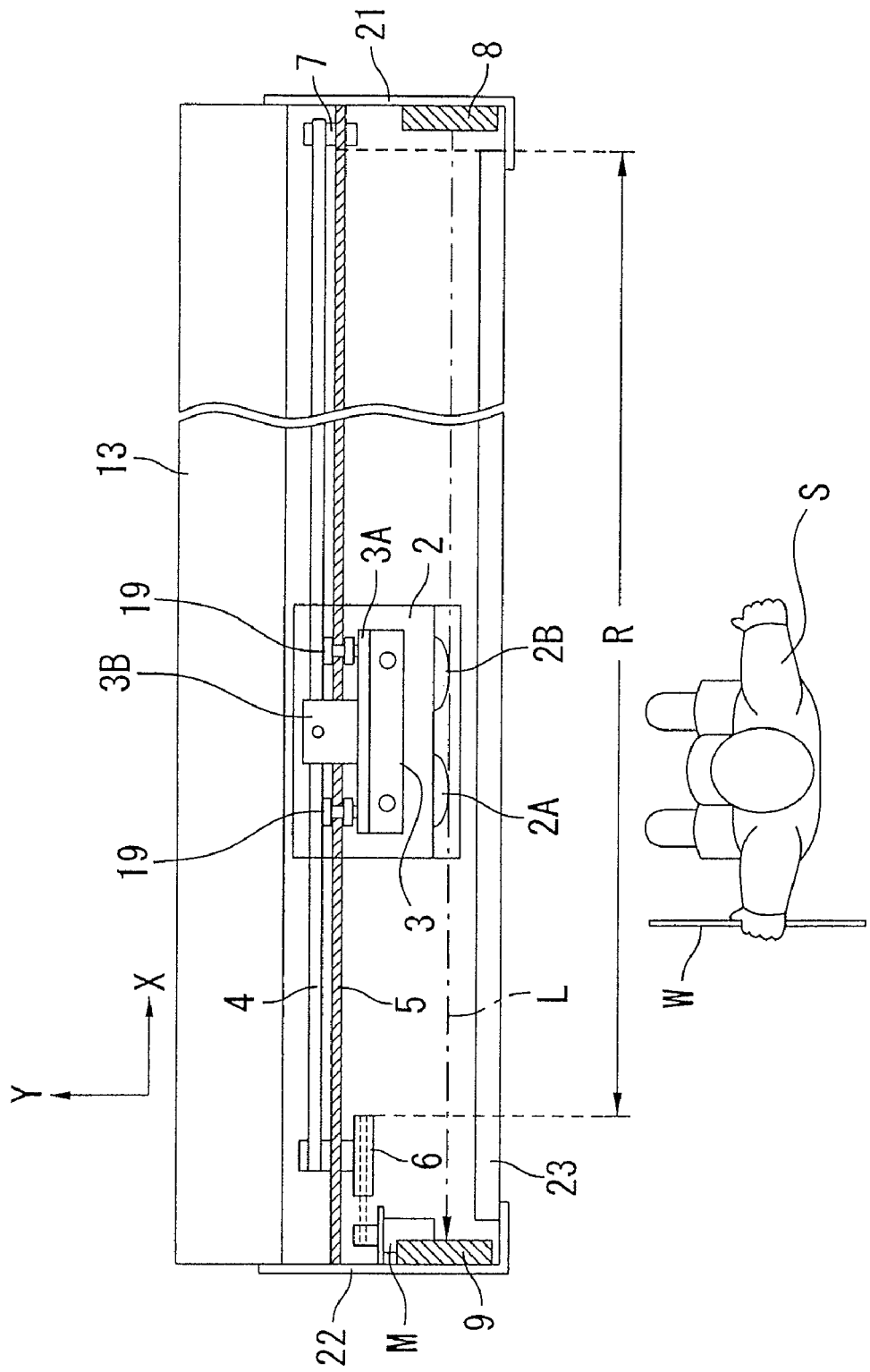
FIG. 2 is a top view of the present invention.

Also, a driving pulley 6 and an idler pulley 7 are rotatably attached to both ends of the above-mentioned guide 5 (FIG. 1 and FIG. 2), and the driving pulley 6 is driven by a motor M put adjacent thereto.

A timing belt 4 runs toroidally around the driving pulley 6 and the idler pulley 7, and an upper part of the timing belt 4 is fixed to a horizontal plate 3B (FIG. 3 and FIG. 4), which protrudes backward (Y-direction) from the mounting member 3 on the foot switch 2 side.

In this structure, when the driving pulley 6 is driven through the motor M (FIG. 1), the revolving movement is converted into linear motion through the timing belt 4 and transferred to the foot switch 2, and thus the foot switch 2 is positioned by moving to the point in front of the forementioned positioning point X of the workpiece (FIG. 5 to FIG. 8).

According to the present invention, as mentioned above, the foot switch can be freely moved to the point in front of the positioning point X of the workpiece or the actual bending position, whereby a distance between the worker S, who works in front of the bending position, and the foot switch 2 becomes short, which can lead to improved work efficiency.

As the ram start-up device, a two-hand manual operating device wherein the worker S operates with his/her both hands may be used instead of the foot switch 2; and as the transfer mechanism of the ram start-up device (FIG. 3 and FIG. 4), a ball screw mechanism or a fluid cylinder mechanism may be provided instead of the timing belt mechanism.

In this case, the foot switch 2 is positioned at the point in front of the positioning point X of the workpiece (FIG. 5 to FIG. 8), as mentioned above, and the positioning point X of the workpiece is an intermediate point between positioning points $X_1$ and $X_2$ of the abutments 10 and 11, $X=(X_1+X_2)/2$ in the left-right direction (X-direction).

The points $X_1$ and $X_2$ of the abutments 10 and 11 in the left-right direction (X-direction), from which the positioning point X of the workpiece is determined, are determined depending on which part of the workpiece W is abutted against the abutments 10 and 11 based on a shape of the workpiece W.

Figure 5:
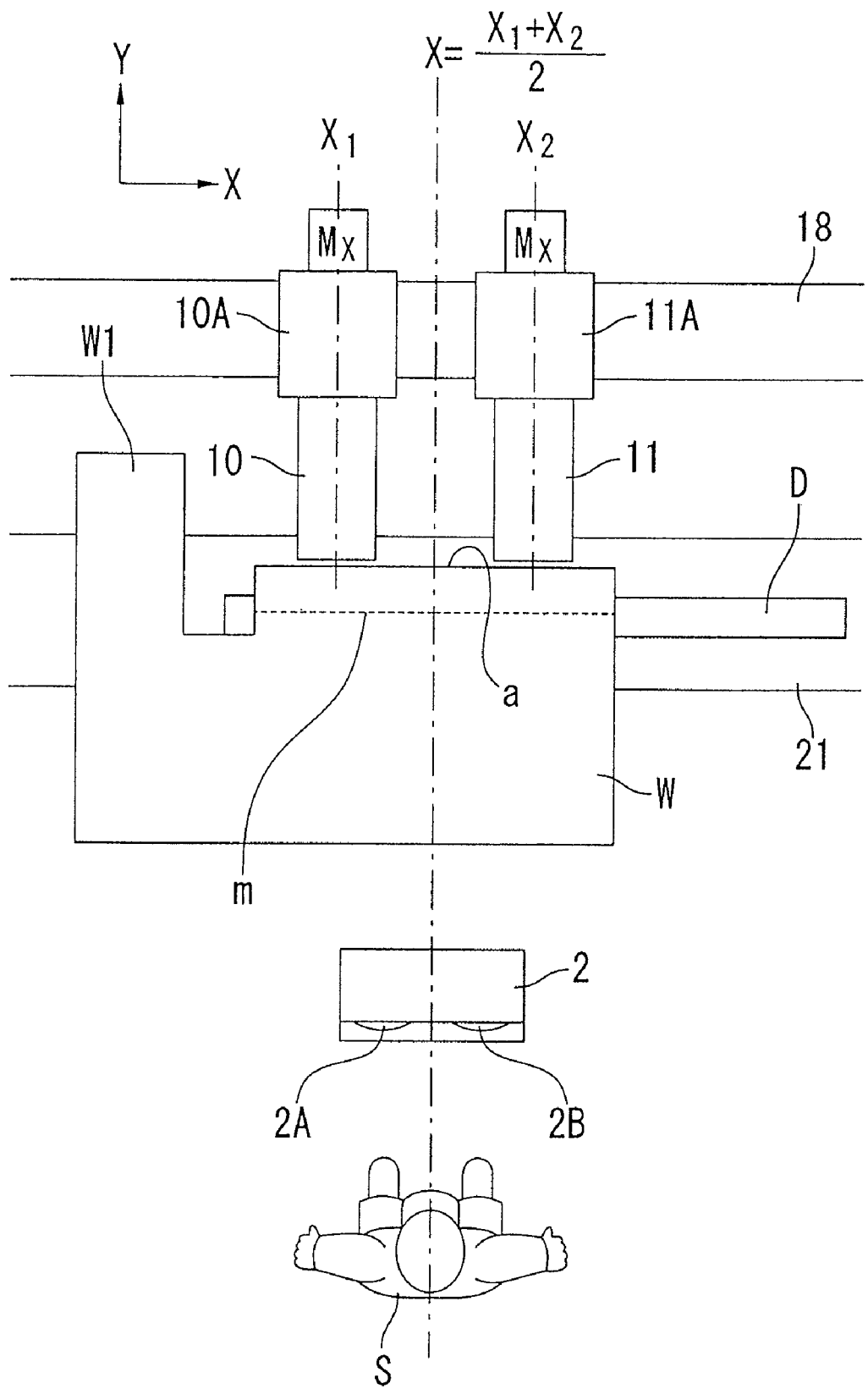
FIG. 5 is a view showing a first example of a workpiece positioning point according to the present invention.

FIG. 5 shows a case where an edge a, which is closer to a bending line m, is placed to the abutments 10 and 11 side for easy abutting of a workpiece W, and while an projected part $W_1$ is placed to the left side of a processing station position (at a position of a tool D) so as not to be bent, the edge a is abutted against the abutments 10 and 11.

Figure 6:
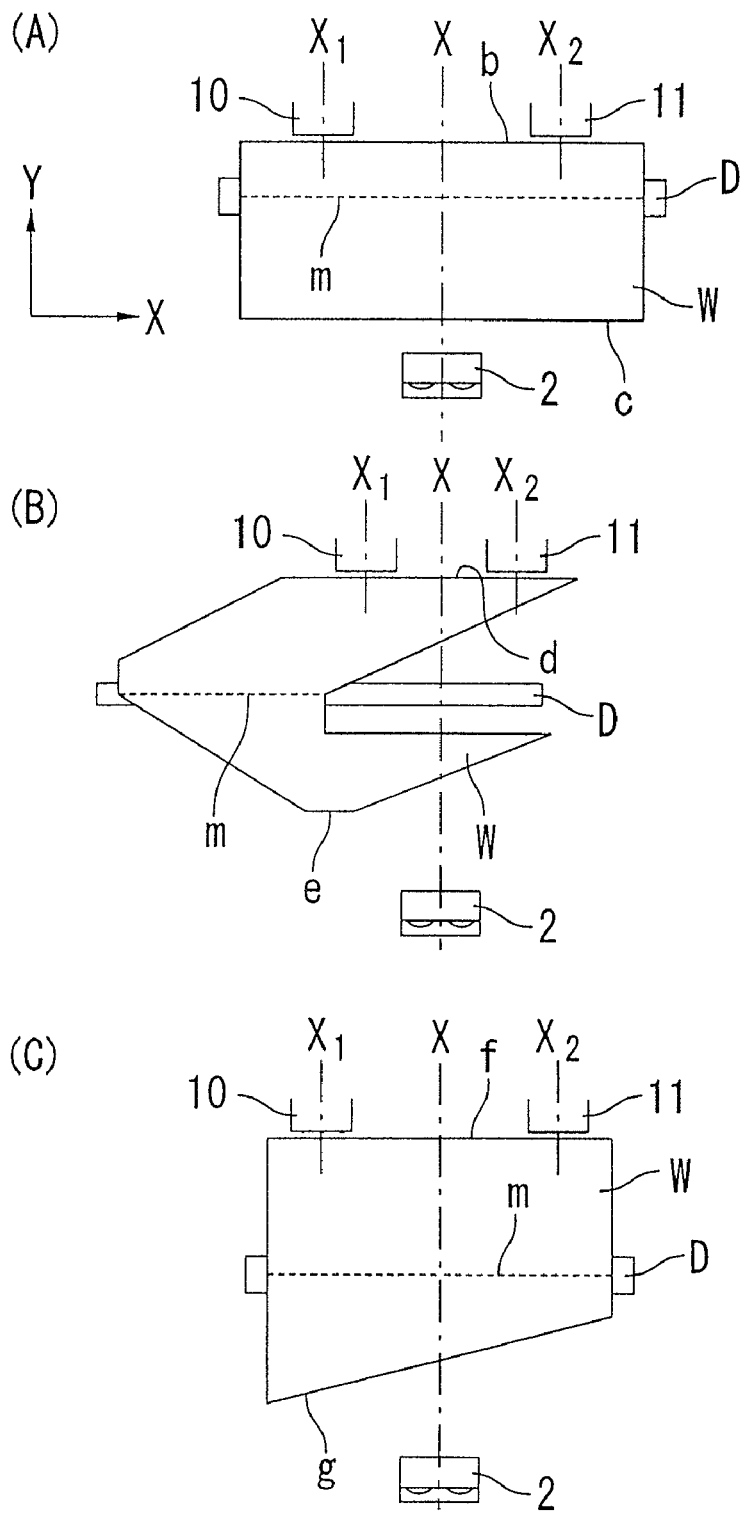
FIG. 6 is a view showing a second example of a workpiece positioning point according to the present invention.
Figure 7:
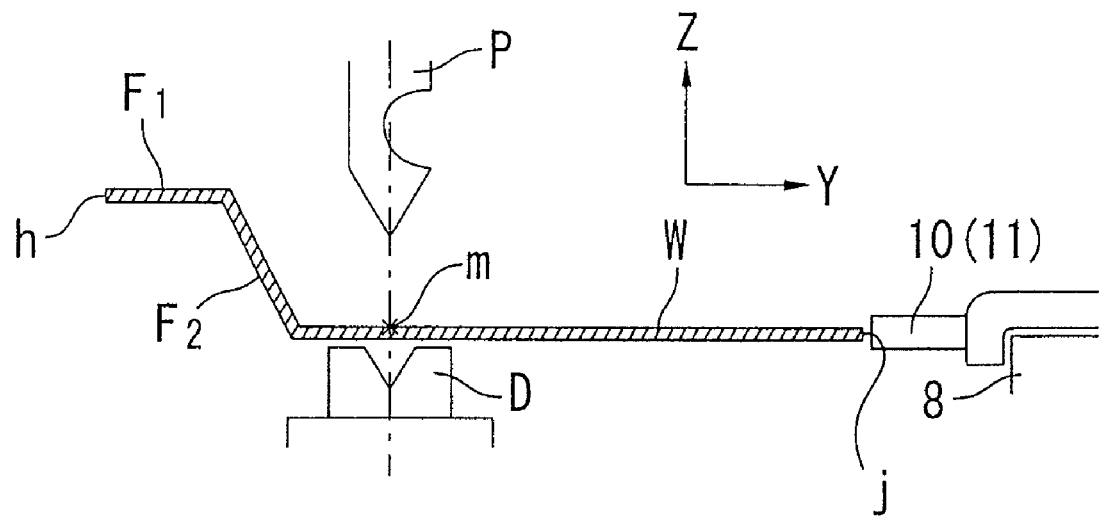
FIG. 7 is a view showing a third example of a workpiece positioning point according to the present invention.
Figure 7:
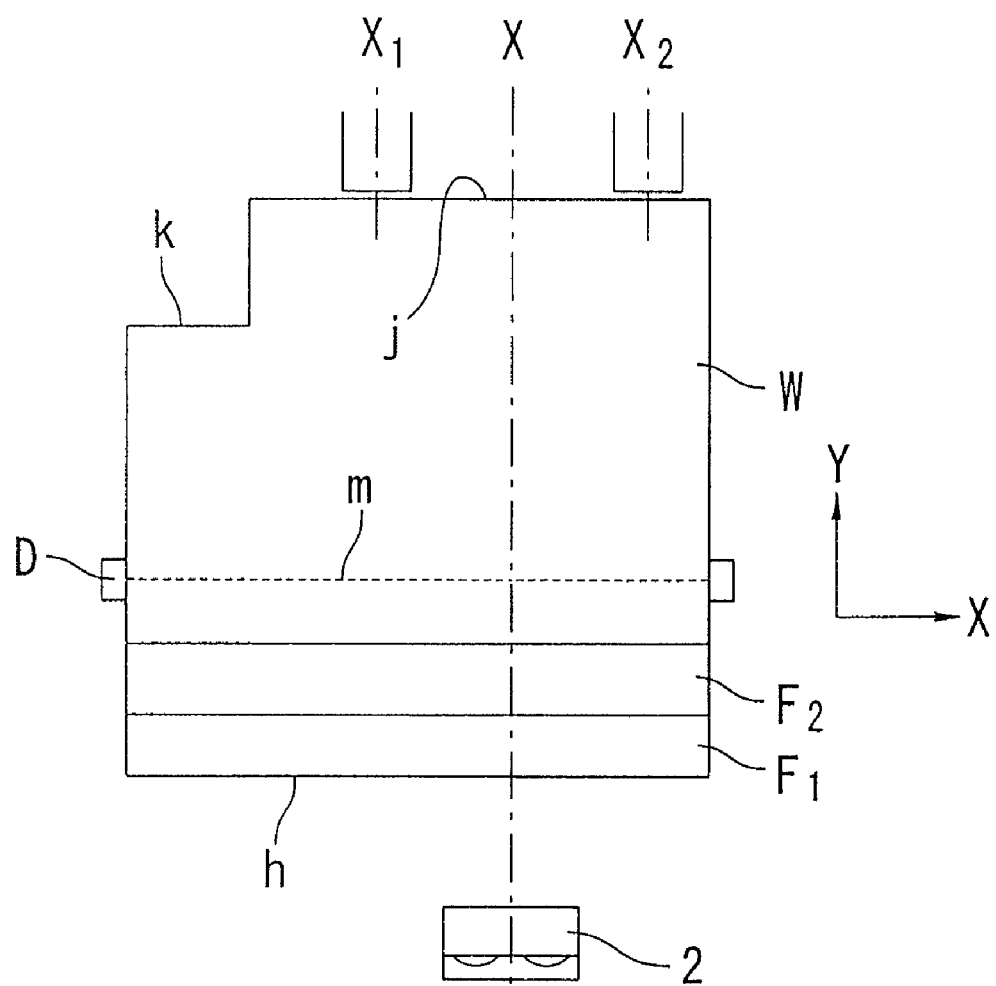

FIG. 6 to FIG. 7 show cases where abutments 10 and 11 are abutted against either edge of a workpiece W in the front-back direction (Y-direction).

Among them, FIG. 6(A) shows a case where there are edges b and c having the same length (X-direction) in the front-back direction (Y-direction) as each other. In this case, the edge b closer to a bending line m is abutted against the abutments 10 and 11 due to easier abutting of the workpiece W.

FIG. 6(B) is a case where there is a very short edge e at one side in the front-back direction (Y-direction) and the edge e cannot be abutted against the two abutments 10 and 11, and thereby, a workpiece W cannot be positioned on this side. In this case, another longer edge d is abutted against the abutments 10 and 11.

FIG. 6(C) shows a case where there is an oblique edge g at one side in the front-back direction (Y-direction), and if this oblique edge g is abutted against the two abutments 10 and 11, a workpiece W is unstably positioned. In this case, another horizontal edge f is abutted against the abutments 10 and 11.

FIG. 7 shows a case where there is an edge h closer to the bending line m at one side in the front-back direction (Y-direction), but on the edge h side, there are flanges $F_1$ and $F_2$, which make it very difficult to abut the edge h against the abutments 10 and 11, that is, it is difficult to position a workpiece W there. In this case, a shorter edge k (a bottom view in FIG. 7) of the other edges cannot be abutted against the two abutments 10 and 11, and therefore, a longer edge j is abutted against the abutments 10 and 11.

Figure 8:
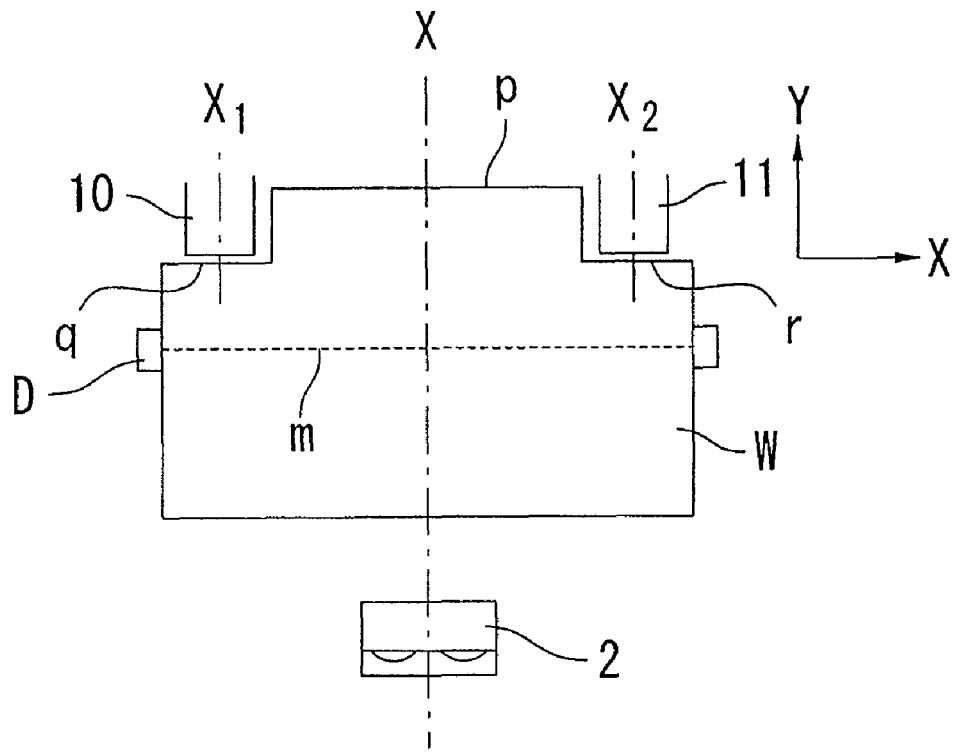
FIG. 8 is a view showing a fourth example of a workpiece positioning point according to the present invention.
Figure 8:
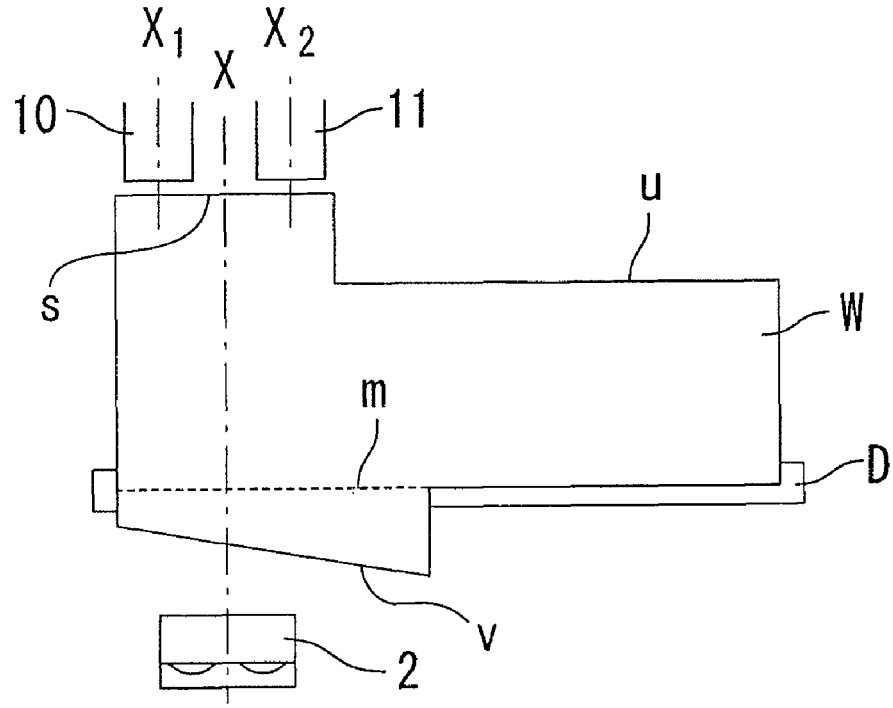

FIG. 8 shows cases where the abutments 10 and 11 are abutted against any edges out of 2 or more abuttable edges of a workpiece W in the left-right direction (X-direction).

Among them, FIG. 8(A) shows a case where among an edge p as well as edges q and r on both sides thereof, which are closer to the bending line m compared with another edge i, if the edge p is abutted against the abutments, a worker holding a workpiece W cannot operate stably. In this case, the edges q and r on both sides of the edge p are abutted against abutments 10 and 11.

FIG. 8(B) shows a case where it is difficult to abut an edge v, which is closer to the bending line m, against both abutments 10 and 11 and positioning of a workpiece W becomes unstable, as mentioned above (FIG. 6(C)), and therefore it is desirable to abut edge s or u, which are more distance from the bending line m. But if the edge u is abutted, the overlapping part between the abutments 10 and 11 and the bending line m is small, which causes unstable operation during processing. In this case, the edge s is abutted against the abutments 10 and 11.

Brackets 21 and 22 protruding forward are provided at both sides of the bottom edge of the lower table 13 (FIG. 1), and a light emitter 8 is attached to one bracket 21 and a light receiving element 9 is attached to the other bracket 22, respectively. A ray of light emits from the light emitter 8 to the light receiving element 9, and both ends of an entry prevention bar 23 (FIG. 2) are attached to the brackets 21 and 22.

By using this structure, when a foreign object such as a hand or a foot of a worker S enters within a region of movement R of the foot switch 2, the ray of light L is blocked to detect the entry of the foreign object, whereby the foot switch 2 does not move, or even if the foot switch 2 has already started moving, it is emergently stopped.

This ray of light L (FIG. 3) covers completely the foot switch 2, and when, for example, even a toe tip of the worker enters the region of movement R, the ray of light is blocked and the foreign object can be detected.

That is, the light emitter 8 and the light receiving element 9 compose of an area sensor, and in general, as mentioned above, it is a foreign object detecting device.

Specific modes for detecting the foreign object may include a mode before moving start of the foot switch 2 and a mode after moving start of the foot switch 2.

For example, while the worker S steps on a pedal 2A or 2B of the foot switch 2 in order to move the ram 12 (FIG. 1) up or down, the ray of light is blocked to detect the entry of the foreign object into the region of movement R, then the foot switch 2 does not move.

In addition, even if the foot switch 2 has once started moving, when the foot of the worker S, the workpiece W, the implement, or the like enters the region of movement R, the ray of light is blocked to detect the entry of the foreign object into the region of movement R, then the foot switch 2 halts moving.

Owing to this, according to the present invention as described above, when there is a foreign object including a part of the body of the worker within the region of movement of the foot switch, the foot switch is arranged not to move, and even if the foot switch has once started moving, when the foreign object enters the region of movement R and the entry is detected, then the switch is emergently stopped, thereby ensuring the safety of the worker.

Figure 11:
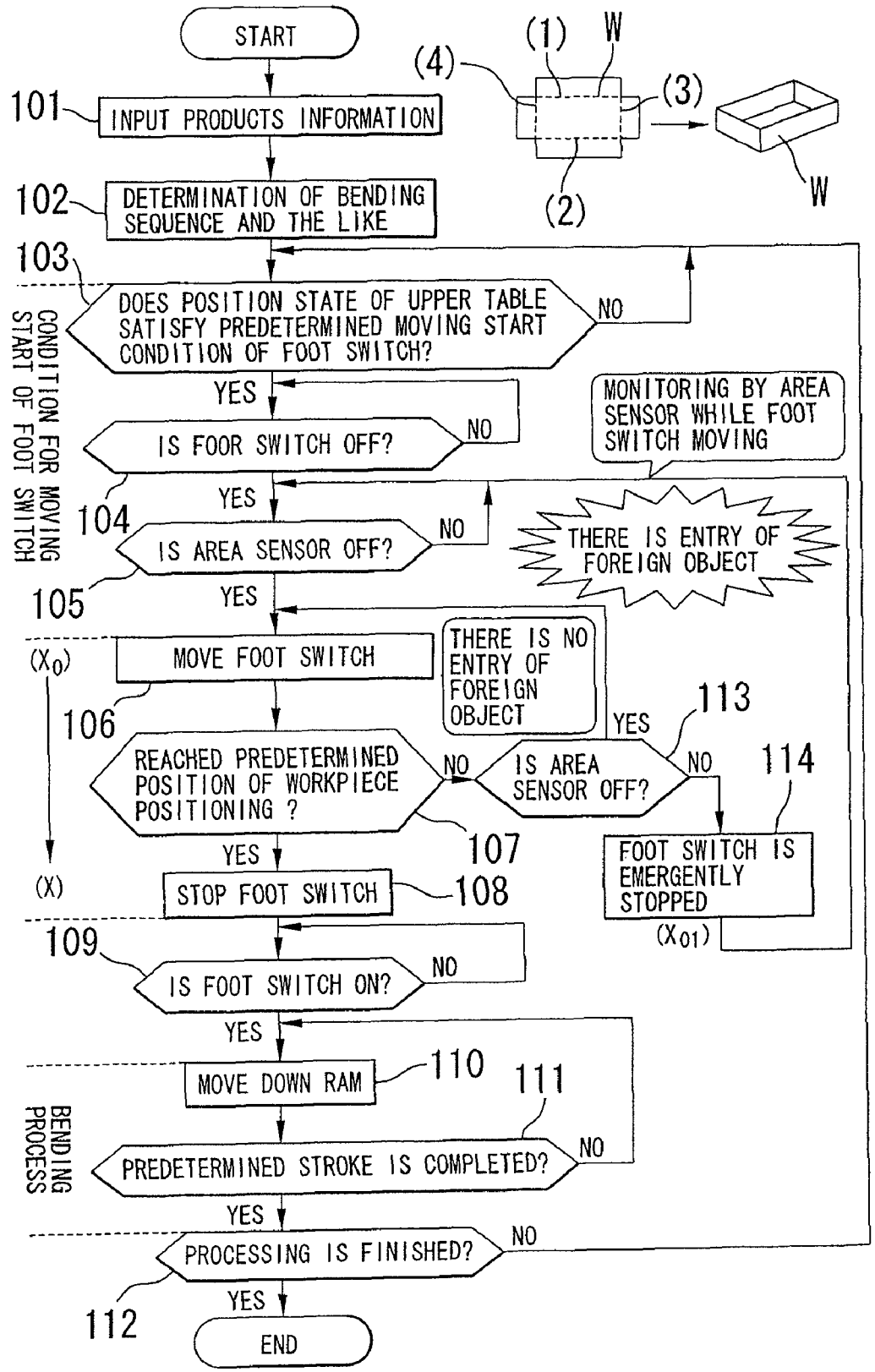
FIG. 11 is a flow chart explaining operation of the present invention.

In this case, if the area sensor is defined to be in ON mode as an operation mode of the area sensor when the ray of light is blocked, and the area sensor is defined to be in OFF mode, when the ray of light is not blocked, the foot switch 2 does not move while the area sensor is in ON mode (NO in Step 105 in FIG. 11), and the foot switch 2 starts moving (Step 106 in FIG. 11) when the area sensor is in OFF mode (YES in Step 105 in FIG. 11).

Even after the foot switch 2 has started moving (Step 106 in FIG. 11), however, monitoring whether or not a foreign object enters the region of movement R of the foot switch 2 by the area sensor (Step 113 in FIG. 11) continues until it reaches the positioning point X of the workpiece (NO in Step 107 in FIG. 11), and when the area sensor becomes ON mode by the entry of the foreign object (NO in Step 118 in FIG. 11), the foot switch 2 is emergently stopped (Step 114 in FIG. 11).

Figure 9:
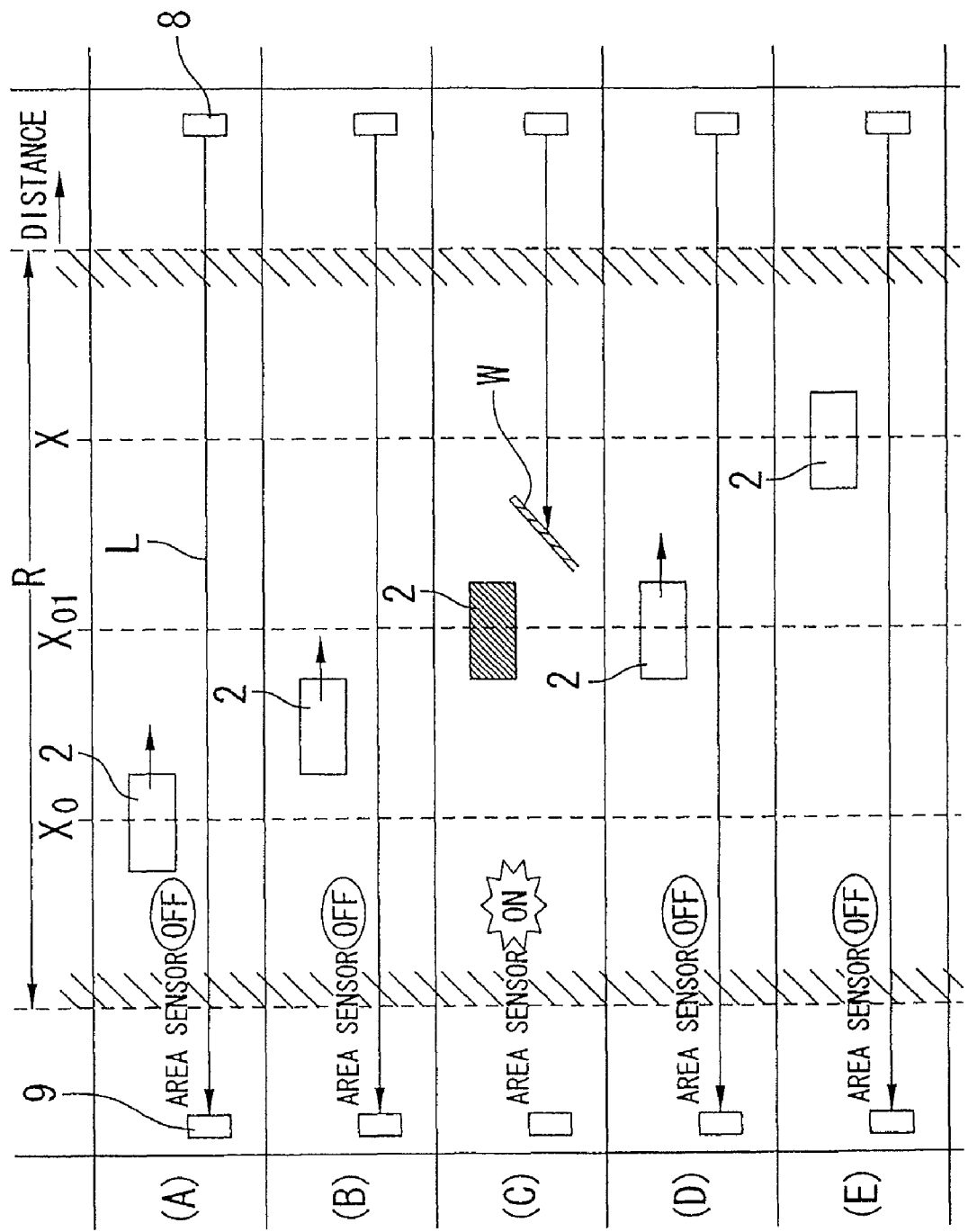
FIG. 9 is a drawing for explaining operation of the foot switch 2 and an area sensor constituting the present invention.

Specifically, as shown in FIG. 9, for example, in case where a current value of the foot switch 2 is $X_0$ and a target value is the positioning point X of the workpiece, the movements of the foot switch 2 from the current value $X_0$ to the target value X are as follows:

In this case, as the conditions for moving start of the foot switch 2, as shown in FIG. 10, the area sensor is to be in OFF mode, and in addition a foot switch 2 is to be in OFF mode as well as the position status of an upper table 12. Thus there are various cases in moving start timing of the foot switch 2.

For example, after a predetermined stroke ($t_1$ to $t_4$ in FIG. 10(B)) is completed by descending the upper table 12, and at the time when bending operation is finished (at $t_5$ in FIG. 10(B)), if the foot switch 2 and the area sensor are in OFF mode, the foot switch 2 can be started moving immediately.

Also, after the predetermined stroke ($t_1$ to $t_4$ in FIG. 10(A)) is completed by descending the upper table 12, and at the time when bending operation is finished (at $t_5$ in FIG. 10(A)), the foot switch 2 is not started moving, and at the time when the upper table 12 returns to a top dead point (at $t_6$ in FIG. 10(A)), if the foot switch 2 and the area sensor are OFF mode, the foot switch 2 can be started moving.

Further, after the predetermined stroke ($t_1$ to $t_4$ in FIG. 10(C)) is completed by descending the upper table 12, and at the time when bending operation is finished (at $t_5$ in FIG. 10(C)), the foot switch 2 is not started moving, and after a predetermined period of time T has elapsed, at the time when the upper table 12 reaches a vicinity of the top dead point ($t_6$ in FIG. 10(A)) and if the foot switch 2 and the area sensor are in OFF mode, the foot switch 2 can be started moving.

According to such conditions of moving start of the foot switch 2, the foot switch 2 (FIG. 9) as mentioned above starts moving from the current value $X_0$ (FIG. 9(A)), and so long as the area sensor is in OFF mode (FIG. 9(B)), it is considered that there is no entry of the foreign object and the switch keeps moving toward the positioning point X of the target value of the workpiece (Step 106⇒NO in Step 107⇒YES in Step 113⇒Step 106 in FIG. 11).

However, for example, when the workpiece W grasped by the worker S (FIG. 2) enters the region of movement R of the foot switch 2 to block the ray of light L, whereby the light receiving element 9 does not receive the light (FIG. 9(C)), then the area sensor is in ON mode and it is considered that there is the entry of a foreign object, and the foot switch 2 is emergently stopped at, for example, a point $X_{01}$ (Step 106⇒NO in Step 107⇒NO in Step 113⇒Step 114 in FIG. 11).

After that, when the worker S notices the entry of the foreign object and withdraws the workpiece W, the receiving element 9 receives the ray of light L again, then the area sensor is in OFF mode (FIG. 9(D)), and the foot switch 2, which has been emergently stopped, is started moving again (Step 114⇒YES in Step 105⇒Step 106 in FIG. 11).

After that, so long as the area sensor is in OFF mode (FIG. 9(E)), the foot switch 2 keeps moving (NO in Step 107⇒YES in Step 113⇒Step 106 in FIG. 11), and when it reaches the positioning point X of the workpiece, the foot switch 2 is stopped (YES in Step 107⇒Step 108 in FIG. 11).

An NC device 20 (FIG. 1) of the press brake having such a structure comprises CPU 20A, input output part 20B, processing information determining part 20C, control part 20D for driving abutments, control part 20E for driving a foot switch, control part 20F for driving an area sensor and control part 20G for driving a ram.

The CPU 20A integrally controls the whole device shown in FIG. 1, such as the processing information determining part 20C, the control part 20D for driving abutments, and the control part 20E for driving a foot switch, according to the operation procedure for performing the present invention (for example, corresponding to FIG. 11).

The input output part 20B is, for example, an operation panel and comprises input part such as a keyboard or a mouse and output part. By using this, product information or the like can be input automatically or manually (Step 101 in FIG. 11), and the input results can be checked on a display.

The product information in this case may include CAD (Computer Aided Design) information including a sheet thickness and a material of a workpiece W, a length of a bending line, a bending angle of a product and sizes of a flange, which are shown as stereoscopic figures or developments.

The processing information determining part 20C determines a bending sequence, tools P and D, a tool layout (processing station), positioning points of the abutments 10 and 11, a positioning points of a workpiece, a D value, an L value, and the like, based on the product information input through the input output part 20B.

Among them, the positioning points of the abutments 10 and 11, for example, points $X_1$ and $X_2$ in the left-right direction (X-direction) are determined, as mentioned above (FIG. 5 to FIG. 8), depending on where in the workpiece W is abutted against the abutments 10 and 11 based on the shape of the workpiece W.

An intermediate point between the thus determined points $X_1$ and $X_2$ of the abutments 10 and 11, $X=(X_1+X_2)/2$ (for example, FIG. 5) is the positioning point X of the workpiece, and the foot switch 2 is moved to a point in front of the positioning point X of a workpiece.

The control part 20D for driving abutments (FIG. 1) positions and controls the abutments 10 and 11 at predetermined positions including the points $X_1$ and $X_2$ in the left-right direction determined, as mentioned above, by the processing information determining part 20C.

The control part 20E for driving a foot switch moves the foot switch 2 to, for example, a point in front of the positioning point X of the workpiece (FIG. 5 to FIG. 8) by driving and controlling the motor M of the driving pulley 6.

The control part 20F for driving an area sensor (FIG. 1) drives and controls the area sensor comprising the light emitter 8 and the light receiver 9, and makes the light emitter 8 emit the ray of light L. When the light is blocked (for example, FIG. 9(C)), as mentioned above, the control part 20F determines that the area sensor is in ON mode and a foreign object enters the region of movement R, and informs it to the control part 20E for driving a foot switch (FIG. 1).

When receiving the information, the control part 20E for driving a foot switch emergently stops the foot switch 2 (NO in Step 113⇒Step 114 in FIG. 11).

The control part 20G for driving a ram (FIG. 1) activates hydraulic cylinders 14 (FIG. 1) and 15 to move the ram or the upper table 12 down, thereby bending operation of the workpiece W is carried out (Step 110⇒YES in Step 111 in FIG. 11), when the foot switch 2 turns to ON mode, for example, by the fact that the worker S steps on the pedal 2B for moving it down (YES in Step 109 in FIG. 11).

Now, the operations of the present invention having the above-mentioned structure will be described based on FIG. 11.

(1) Operations Until the Bending Sequence and the Like are Determined

In Step 101 in FIG. 11 the product information is input, and in Step 102 are determined bending sequence, and the like.

Namely, when the CPU 20A (FIG. 1) detects the input of the product information through the input output part 20B, the CPU 20A determines the bending sequence, the tools P and D, the tool layout (processing station), the positioning points of the abutments 10 and 11, the positioning point X of the workpiece based on the points $X_1$ and $X_2$ in the left-right direction (X-direction) (for example FIG. 5 to FIG. 8) among the positioning points of the abutments 10 and 11, as well as the D value, the L value, and the like, through the processing information determining part 20C.

In this case, for example, the operations in Step 103 to Step 114 in FIG. 11 are carried out in each of the bending sequence (1), (2), (3) and (4) based on the product information, when the workpiece W shown (in FIG. 11) is assumed to be bent into a box product.

A worker S is to previously mount the predetermined tools P and D at predetermined processing stations on the upper and lower tables 12 and 13 for each bending sequence (1), (2), (3) and (4), and is to position the abutments 10 and 11 previously at predetermined points through, for example, the control part 20D for driving an abutment (FIG. 1).

(2) Moving Operation of the Foot Switch 2

(2)-A To Determine Whether the Condition for Moving Start of the Foot Switch is Satisfied or Not It is determined whether or not in Step 103 in FIG. 11 the position of the upper table 12 satisfies a predetermined condition for moving start of the foot switch, in Step 104 the foot switch 2 is in OFF mode, and in Step 105 the area sensor is in OFF mode.

(2)-B Operation in Case Where the Condition for Moving Start is Not Satisfied

That is, when any one of the upper table 12, the foot switch 2, and the area sensor does not satisfy the condition for moving start (any one of Steps 103, 104, and 105 in FIG. 11 is in NO mode), the CPU 20A (FIG. 1) does not start the foot switch 2 moving, and waits until the above three conditions for moving start are satisfied.

(2)-C Operation in Case Where the Condition for Moving Start is Satisfied (2)-C-1 To Determine Whether or Not the Foreign Object Enters the Region of Movement R of the Foot Switch 2

That is, when all of the upper table 12, the foot switch 2 and the area sensor satisfy the condition for moving start (all of Steps 103, 104 and 105 in FIG. 11 are in YES), the CPU 20A (FIG. 1) makes the foot switch 2 move (Step 106 in FIG. 11) and it continues to determine whether or not the foreign object enters the region of movement R of the foot switch 2 through the area sensor (Step 113 in FIG. 11) until the foot switch 2 reaches the positioning point X of the workpiece (NO in Step 107 in FIG. 11).

(2)-C-2 Operation in Case Where the Foreign Object Enters

That is, as a result of the determination about whether or not the foreign object enters the region of movement R of the foot switch 2 through the area sensor (Step 113 in FIG. 11), if the ray of light L from the light emitter 8 (FIG. 1) is blocked and the area sensor is not in OFF mode (NO in Step 113 in FIG. 11), the CPU 20A (FIG. 1) considers that the area sensor is in ON mode and the foreign object enters, makes the foot switch 2 emergently stop (Step 114 in FIG. 11), and determines whether or not the area sensor is in OFF mode again (Step 105 in FIG. 11).

Then, when the area sensor changes to OFF mode (YES in Step 105 in FIG. 11) and the light receiving element 9 receives the ray of light L from the light emitter 8 (FIG. 1), the CPU 20A makes the foot switch 2, which has emergently been stopped, move again (Step 106 in FIG. 11), and after that, when the foot switch 2 reaches the predetermined positioning point X of the workpiece (YES in Step 107 in FIG. 11), it makes the foot switch 2 stop (Step 108 in FIG. 11).

Specifically, for example, the above-mentioned case where FIG. 9(A)⇒FIG. 9(B)⇒FIG. 9(C)⇒FIG. 9(D)⇒FIG. 9(E) is exemplified.

(2)-C-3 Operation in Case Where no Foreign Object Enters

In contrast with the case (2)-C-2, as a result of the determination whether or not the foreign object enters the region of movement R of the foot switch 2 through the area sensor (Step 113 in FIG. 11), if the light receiving element 9 receives the ray of light L from the light emitter 8 (FIG. 1) and the area sensor is in OFF mode (YES in Step 113 in FIG. 11), the CPU 20A (FIG. 1) considers that there is no entry of the foreign object and makes the foot switch 2 keep moving (Step 106 in FIG. 11), and when the foot switch 2 reaches the predetermined positioning point X of the workpiece (YES in Step 107 in FIG. 11), it makes the foot switch 2 stop (Step 108 in FIG. 11).

Specifically, for example, this is the case where FIG. 9(A)⇒FIG. 9(B)⇒FIG. 9(E) is exemplified, and any foreign object does not enter the region of movement R of the foot switch 2 at all until the foot switch 2 reaches the target value X from the current value $X_0$ of moving start of the switch.

(3) Bending Operation

In Step 108 in FIG. 11, when the foot switch 2 stops, the worker S (for example, in FIG. 5) stands in front of the foot switch 2 that has stopped and abuts the workpiece W against the abutments 10 and 11 to position it, and then steps on the pedal 2B for moving down (FIG. 1), which causes foot switch 2 to be in ON mode (YES in Step 109 in FIG. 11). The CPU 20A (FIG. 1), which detects it, activates the hydraulic cylinders 14 and 15 through the control part 20G for driving a ram to move the ram 12 down (Step 110 in FIG. 11), and when the predetermined stroke is completed (YES in Step 111 in FIG. 11), the CPU determines whether the processing is finished or not (Step 112 in FIG. 11).

For example, if the CPU 20A (FIG. 1) determines that the operations of Step 103 to Step 112 in FIG. 11 for only the bending (1) (FIG. 11) are finished, the same operations as above are repeated for a bending (2) from Step 103.

As mentioned above, the operations of Step 103 to Step 112 are repeated for the bending (2), (3) and (4) in turn, and finally all of the operations are completed (END in FIG. 11).

FIG. 12 to FIG. 15 are views showing other embodiments of the present invention, in which the point of the foot switch 2, which is moved to the point in front of the positioning point X of a workpiece in FIG. 1 to FIG. 11, is to be changed based on a bending trial.

That is, conventionally, the bending lines are in end portions of one workpiece to be processed in the left-right direction sometimes. In that case even if the foot switch is moved to the point in front of the processing station or the point in front of the center point of the back-end of the workpiece, the distance between the actual processing point (end portion in the left-right direction of the workpiece) and the foot switch is long.

As a result, it is extremely inconvenient for the worker to work, which apparently leads to lower the working efficiency. In view of this, in FIG. 1 to FIG. 11, the foot switch 2 was arranged to move to the point in front of the positioning point X of the workpiece, which is the actual bending point, (for example, FIG. 8) at each bending.

By using this arrangement, the distance between the foot switch 2 and the actual processing point became very short, and therefore, after positioning the workpiece at the actual processing point, the worker could step on the foot switch 2 to start up the ram 12 and process the workpiece, whereby it became very easy for the worker to work and the working efficiency was improved.

In case where individualities of workers (for example, right-handed or left-handed, and the like) are taken into consideration, if the foot switch 2 is automatically moved to the point in front of the positioning point X of the workpiece (for example FIG. 8), as mentioned above, then the working efficiency is rather lowered instead. Accordingly, in order to reflect the workers' individualities, the target value X, which has been automatically set, must be changed.

Figure 12:
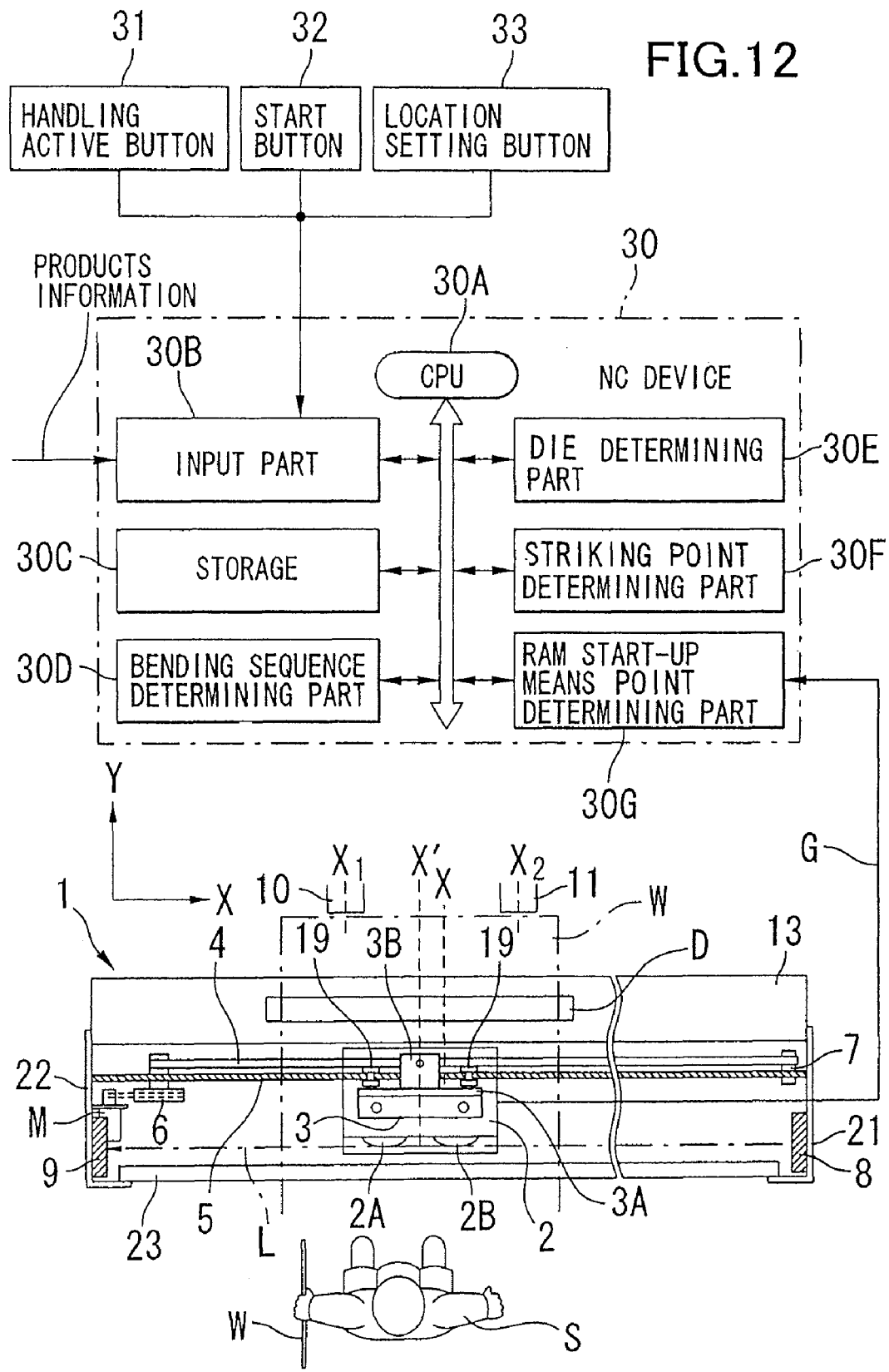
FIG. 12 is an overall view showing another embodiment of the present invention.
Figure 13:
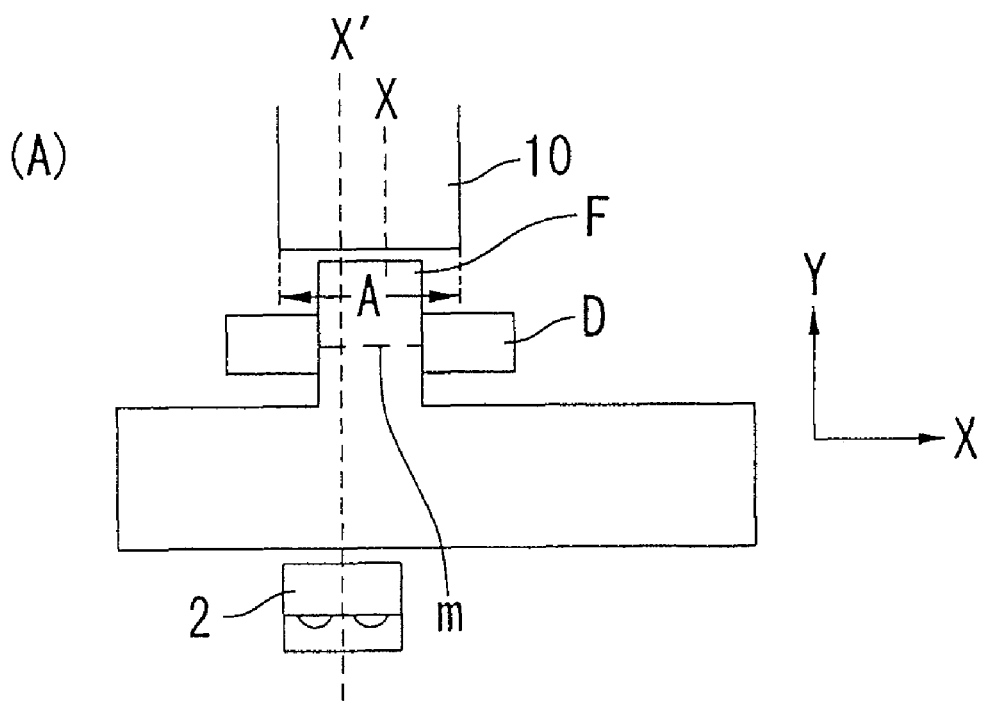
FIG. 13 depicts views showing a relationship between an abutting width A and B of abutments 10 and 11, and a position X' of the foot switch 2 in FIG. 12.
Figure 13:
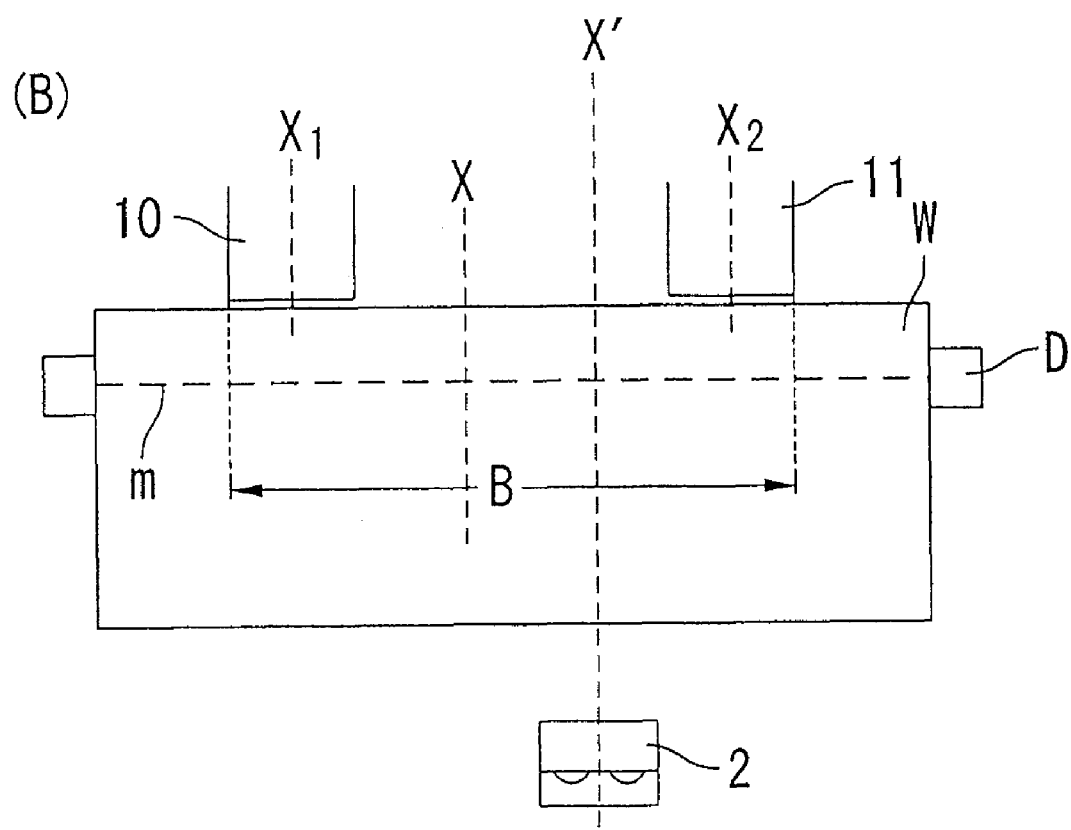

In FIG. 12, the bending apparatus 1 is, for example, a lifting-down type press brake having the same structure as shown in FIG. 1, and an NC device 30 comprises an input part 30B, a storage 30C, a bending sequence determining part 30D, a tool determining part 30E, an abutment point determining part 30F, and a ram start-up device point determining part 30G.

Figure 14:
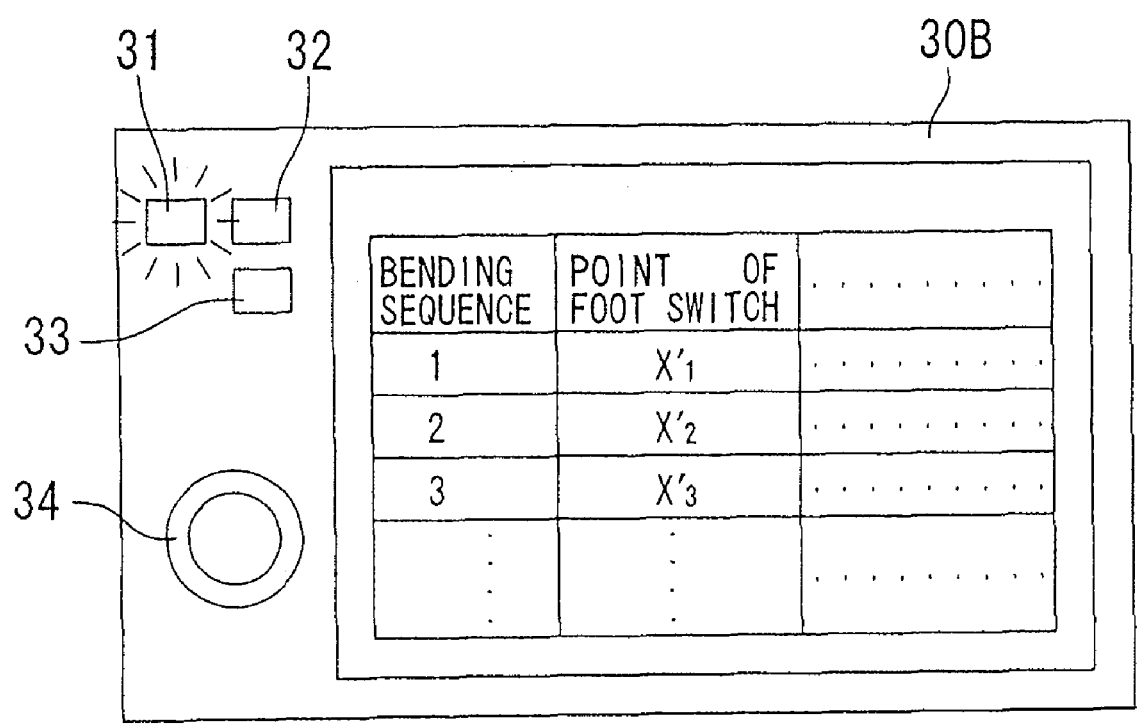
FIG. 14 is a view showing an operation screen in FIG. 12.
Figure 15:
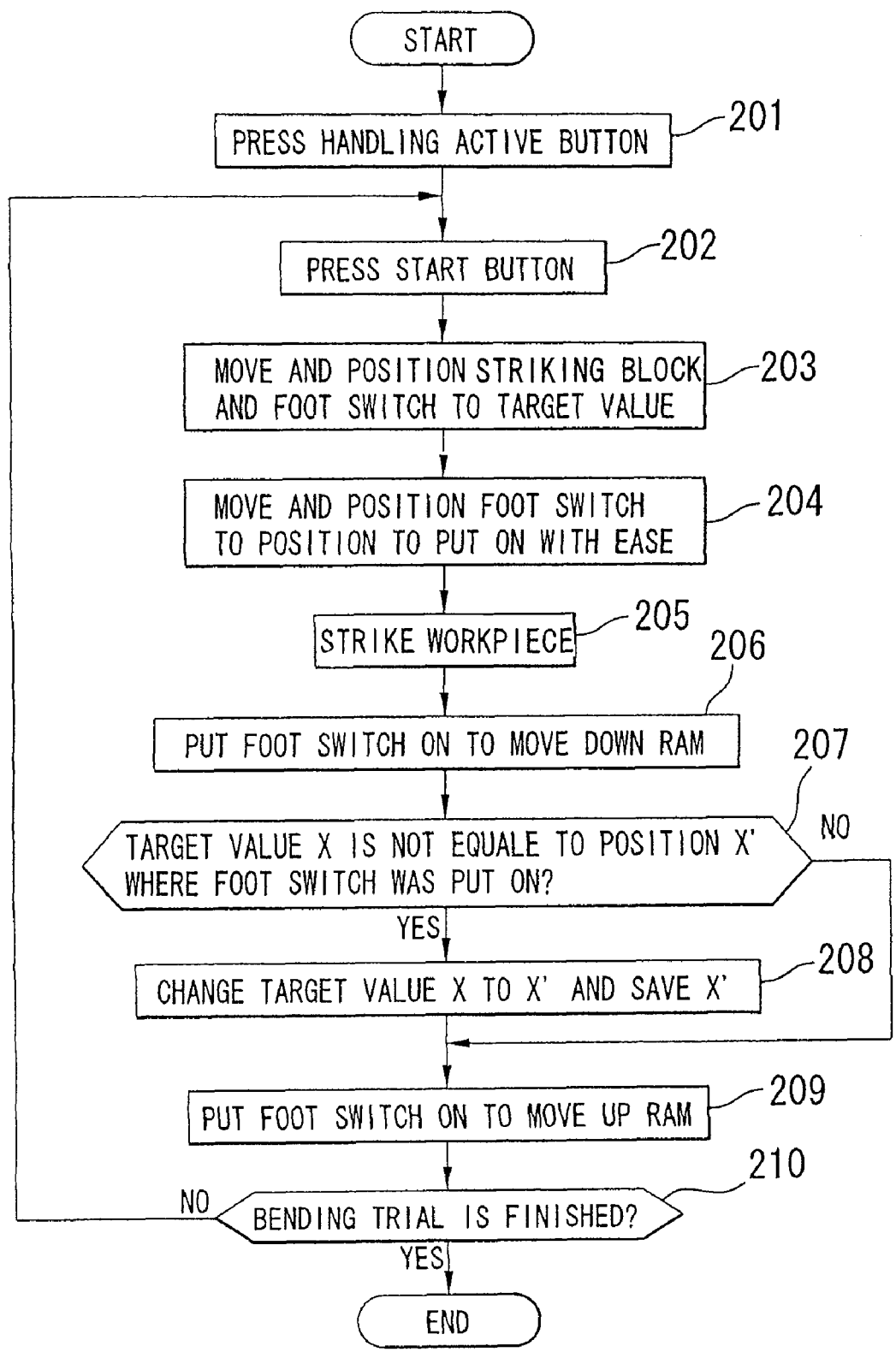
FIG. 15 is a flow chart explaining operation in FIG. 12.

Among them, the input part 30B is an operation panel, for example, by which product information can be input as previously, and a handling active button 31 and a start button 32, which will be described below are provided (FIG. 14, and Step 201 and Step 202 in FIG. 15).

Based on product information put through the input part 30B (FIG. 12), the bending sequence determining part 30D determines a bending sequence of a workpiece W, and the tool determining part 30E determines tools and a tool used in each bending sequence.

Based on the bending sequence, the tools and the tool layout, the abutment point determining part 30F determines points $X_1$ and $X_2$ (target values) of abutments 10 and 11 in the left-right direction.

The ram start-up device point determining part 30G determines a point X (a target value) of ram start-up device 2 such as the foot switch in the left-right direction based on the points $X_1$ and $X_2$ of the abutments 10 and 11 determined by the abutment point determining part 30F, within a range of an abutting width A or B procured from one or more abutments 10 and 11.

In this case, the number of the abutments 10 and 11 of the back gauge placed behind the lower table 13 is usually more than one, but the number of the abutments to be used depends on the shape of the workpiece W.

For example, as shown in FIG. 13(A), when an abutting portion of a workpiece W is a flange F having a narrower width than a width of one abutment 10, the ram start-up device point determining part 30G determines a substantially intermediate point X of a width A of this one abutment as the point X (target value) of the foot switch 2 in the left-right direction within the range of the width A of the abutment 10.

Alternatively, as shown in FIG. 13(B), for example, when a part of a workpiece W to be abutted is relatively long, and is abutted against two abutments 10 and 11, within an abutting width B, namely, a range from a left end of the one abutment 10 to the right end of the abutment 11, the ram start-up device point determining part 30G determines a substantially intermediate point X (target value) of the abutting width B as the point X of the foot switch 2 in the left-right direction.

As described below, when the target value X is different from a point X' at which a worker S actually steps on the foot switch 2 (YES in Step 207 in FIG. 15), the target value X is changed to X', and the value X' is saved in the storage 30C (FIG. 12) and is used in the bending steps, from the viewpoint of improvement of work efficiency.

Now, the operations of the present invention having the above-mentioned structure will be described based on FIG. 15.

In this case, the target values $X_1$ and $X_2$ of the abutments 10 and 11 and the target value X of the foot switch 2 are presumed to have been previously decided according to the abutment point determining part 30F (FIG. 12) and the ram start-up device point determining part 30G.

(1) Operation Until the Worker S (FIG. 12) Moves and Positions the Foot Pedal 6 to a Point at Which it is Easy for the Worker to Step on the Pedal.

In Step 201 in FIG. 15 the handling active button 31 is pressed, in Step 202 the start button 32 is pressed, in Step 203 the abutments 10 and 11 and the foot switch 2 are moved and positioned to the target values, and in Step 204 the foot switch 2 is moved positioned to a point at which it is easy for the worker to step on the pedal.

That is, when the worker S (FIG. 12) presses the handling active button 31, the button lights and the mode is switched to a modification mode according to a bending trial of the present invention, and then when the start button 32 is pressed, the CPU 30A, which detects it, positions the abutments 10 and 11 at the original target points $X_1$ and $X_2$ as well as the foot switch 2 at the original target point X.

During the above-mentioned operation, the handling active button 31, which was lighting, turns into flashing, which means conditions in which a bending trial can be carried out and the ram 12 (FIG. 1) can be worked (closing operation)

The worker S (FIG. 12) moves the foot switch 2, which has been moved at the original target value X, to a point X' at which it is easy to switch on at actual processing, in other words, it is easy to step on, and positions the switch at the point X'.

For example, the worker may move the foot switch 2 (FIG. 12) to the point X' at which it is easy to step on, while he pushes aside the foot switch 2 with his/her hand or foot, or he/she rotates a hand pulser 34 (FIG. 14).

(2) Setting Operation for the New Target Value X'

In Step 205 in FIG. 15 the workpiece W is abutted, in Step 206 the foot switch 2 is turned on to move the ram 12 down, and if in Step 207 the original target point X and the point X' at which the foot switch 2 is turned on are different from each other (YES), then in Step 208 the original target point X is changed to the point X' and the point X' is saved, and if the original target value X and the point X' at which the foot switch 2 is turned on are equal (NO), then the operation goes to Step 209.

That is, the worker S (FIG. 12), as mentioned above, moves the foot switch 2 to the point at which it is easy to step when the moving down operation is actually performed, and positions it there, then the workpiece W is abutted to the abutments 10 and 11, which are positioned at the target points $X_1$ and $X_2$, and the CPU 30A detects that the foot pedal 2B for moving down of the foot switch 2 is stepped on, and makes the ram 12 (FIG. 1) move down, whereby the workpiece W is bent.

At that time, the handling active button 31 lights, and the working state (closing operation) of the ram 12 finishes.

When the point X' at which the foot switch 2 is stepped on and the original target point X are different from each other, the CPU 30A saves the point X' in the storage 30C through the ram start-up device point determining part 30G in order to change the original target point X to the point X' at the time when an ON signal G from the foot switch 2 is output.

In the following bending steps, the ram start-up device point determining part 30G uses the memorized point X' as a new target value.

After that, the worker S steps on the moving up foot pedal 2A of the foot switch 2 to move the ram 12 (FIG. 1) up (Step 209 in FIG. 15), and when the bending trial is not finished (NO in Step 210 in FIG. 15), the same operations are repeated from Step 202.

Thus, the changed results at each bending sequence 1 (FIG. 14), 2 . . . , etc., are shown on a display of the operation panel 30B as the point $X_1'$, $X_2'$ . . . , etc., of the foot switch, and when an inexperienced worker performs the same processing, the working efficiency can be more improved by reflecting the changed results.

Further, as mentioned above, if the new target point X' is to be automatically saved in the storage 30C, automatic saving is performed when the ON signal G is output from the foot switch 2. Therefore such a troublesome operation as a worker presses a button for saving are not necessary, and the working efficiency is improved in this view point as well.

Figure 16:
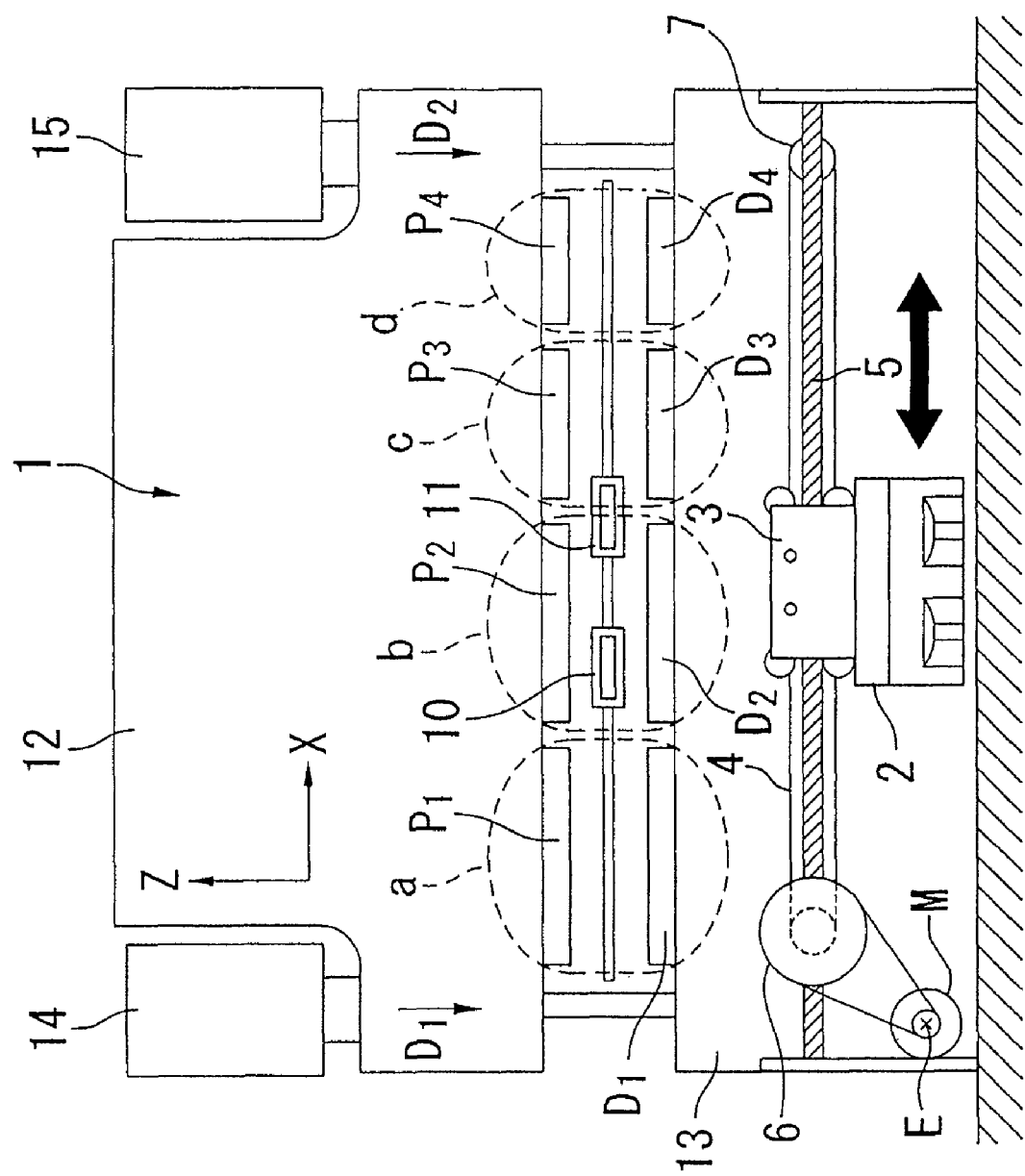
FIG. 16 is a view showing still another embodiment of the present invention (teaching method)

FIG. 16 shows further another embodiment of the present invention, which is a manual setting mode by a worker (teaching method) and uses an NC device 30 shown in FIG. 12 as a control device.

In this case, after a worker decides bending sequences 1, 2, 3 and 4, tools $P_1$ and $D_1$, tools $P_2$ and $D_2$, tools $P_3$ and $D_3$, and tools $P_4$ and $D_4$ (FIG. 16), a tool layout a, b, c, or d, a D value, a L value, and the like at each bending sequence 1, 2, 3 or 4, based on product information, points of the abutments 10 and 11 in the left-right direction are decided through the abutment point determining part 30F (Step 301 in FIG. 18).

Figure 17:
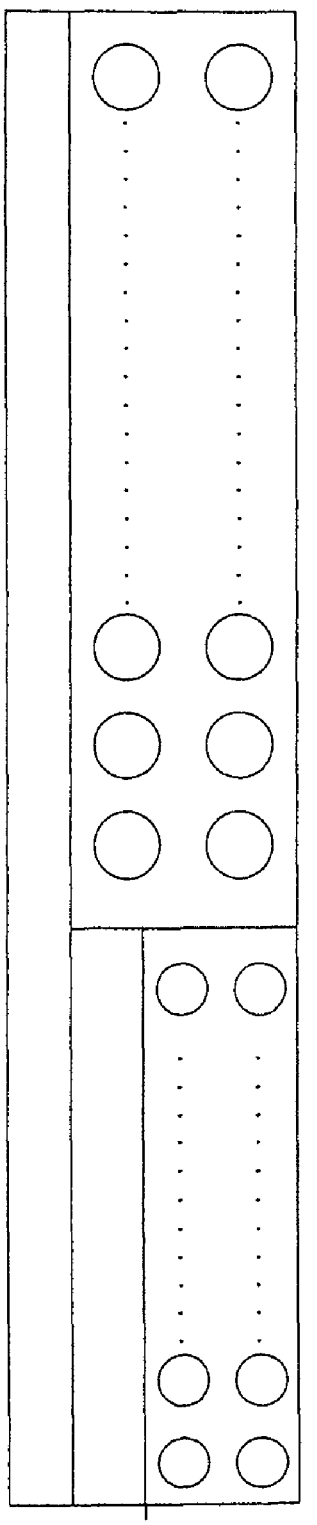
FIG. 17 is a view showing an operation screen in FIG. 16.

The decided results, as shown in FIG. 17, are shown on a display of an operation panel 30B, and while watching the display, the worker pushes aside the foot switch 2 (FIG. 16) with his/her hand or foot, or he/she rotates a hand pulser 34 (FIG. 14), and moves the foot switch 2 (FIG. 16) to a predetermined point and positions the switch there (Step 302 in FIG. 18).

After that, the worker presses a location setting button 33 provided on the operation panel 30B (FIG. 12) to detect a travel point of the foot switch 2 and save the same (Step 308⇒Step 304 in FIG. 18).

That is, when the CPU 30A detects that the location setting button 33 (FIG. 12) is pressed, and detects the travel point of the foot switch 2 through the ram start-up device point determining part 30G based on the number of revolution of an encoder F of a motor M, constituting a drive mechanism of the foot switch 2 (FIG. 16), and the travel point is saved in the storage 30C (FIG. 12).

In this case, the point of the foot switch 2 determined by the ram start-up device point determining part 30G (target value) is usually, as mentioned above, within the range of an abutting width A or B, procured by one or more of the abutments 10 (corresponding to FIG. 13) and 11.

The worker repeats the operations (Step 302⇒Step 304 in FIG. 18) at each bending so long as the teaching is not finished (NO in Step 305), and after the teaching is finished (YES in Step 305), the final results are expressed, as shown in FIG. 17, on the display of the operation panel 30B as the foot switch points X1', X2' . . . , etc.

INDUSTRIAL APPLICABILITY

The present invention is applicable to a bending apparatus, which aims to improve the working efficiency by making a foot switch movable to a point in front of an actual bending point, and ensures safety of workers by preventing the foot switch from moving when a foreign object including a body part of a worker is present within the region of movement of the foot switch, and even if the foot switch is once started moving, and then a foreign object enters the region of movement, the switch moving is emergently stopped by detecting the entry. Specifically, the present invention is applicable to not only the above-mentioned lifting-down type press brakes (FIG. 1) but also to lifting-up type press brakes wherein a lower table 2 or a ram is moved up to bend a workpiece W with a punch P and a die D, and furthermore, to a case where the ram start-up device is not only the foot switch but also two-hand operating devices, and the transfer mechanism of the ram start-up device is not only the timing belt mechanism but also a ball screw mechanism or a fluid cylinder mechanism.

The invention claimed is:

1. A bending apparatus for starting a ram to bend a workpiece abutted against abutments of a back gauge, the bending apparatus comprising:
    a ram start-up device configured to be movable in a lateral direction; and
    a controller configured to select edges of a workpiece to be abutted against the abutments, based on a shape of the workpiece when the workpiece is to be bent, and configured to move the ram start-up device to a point in front of positioning points of the abutments corresponding to points of the selected edges,
    wherein the ram comprises at least one of an upper table to which a punch is attached and a lower table to which a die is attached.

2. The bending apparatus according to claim 1,
    wherein the point in front of positioning points of the abutments corresponding to points of the selected edges is an intermediate point in the lateral direction between positions of the abutments.

3. The bending apparatus according to claim 1,
    wherein the ram start-up device comprises one of a foot switch and a two-hand operating device.

4. The bending apparatus of claim 3,
wherein the ram start-up device further comprises a transfer mechanism that includes a guiding mechanism and a driving mechanism,
wherein the guiding mechanism comprises a guide disposed in the lateral direction and a roller rotatably disposed on a side of the ram start-up device and slidably attached to the guide, and
wherein the driving mechanism comprises a driving pulley and an idler pulley disposed on both ends of the guide and a timing belt toroidally disposed around both the driving pulley and the idler pulley and fixed on the side of the ram start-up device.

5. A bending apparatus for starting a ram to bend a workpiece abutted against abutments of a back gauge, the bending apparatus comprising:
a ram start-up device configured to be movable in a lateral direction;
a foreign object detector that detects entry of a foreign object into a region of movement of the ram start-up device; and
a controller that prevents the ram start-up device from moving when the entry of the foreign object is detected,
wherein the ram comprises at least one of an upper table to which a punch is attached and a lower table to which a die is attached.

6. The bending apparatus according to claim 5,
wherein the foreign object detector comprises a light emitter and a light receiving element, and when a ray of light from the light emitter is blocked, the entry of the foreign object is detected.

7. The bending apparatus according to claim 5,
wherein the ram start-up device comprises one of a foot switch and a two-hand operating device.

8. The bending apparatus of claim 7,
wherein the ram start-up device further comprises a transfer mechanism that includes a guiding mechanism and a driving mechanism,
wherein the guiding mechanism comprises a guide disposed in the lateral direction and a roller rotatably disposed on a side of the ram start-up device and slidably attached to the guide, and
wherein the driving mechanism comprises a driving pulley and an idler pulley disposed on both ends of the guide and a timing belt toroidally disposed around both the driving pulley and the idler pulley and fixed on the side of the ram start-up device.

9. A bending apparatus for starting a ram to bend a workpiece abutted against abutments of a back gauge, the bending apparatus comprising:
a ram start-up device configured to be movable in a lateral direction;
an input part that inputs product information;
a bending sequence determiner that determines a bending sequence in which the workpiece is to be bent based on the product information;
a tool determiner that determines at least one of a punch and a die used to bend the workpiece and a tool layout of the at least one of the punch and the die when the workpiece is to be bent;
an abutment point determiner that determines a point of an abutment in the lateral direction based on a bending sequence in which the workpiece is to be bent, the at least one of the punch and the die used to bend the workpiece, and the tool layout of the last least one of the punch and the die when the workpiece is to be bent; and
a ram start-up device point determiner that pre-determines a point of the ram start-up device in the lateral direction within a range of an abutting width procured from at least one abutment based on the determined point of the abutment in the lateral direction, and when the ram start-up device actually moves to a point different from the pre-determined point, that determines the actual moving point as a final point of the ram start-up device,
wherein the ram comprises at least one of an upper table to which a punch is attached and a lower table to which a die is attached.

10. The bending apparatus according to claim 9,
wherein the ram start-up device point determiner determines a substantially intermediate point of an abutting width procured from at least one abutment as the point of the ram start-up device in the lateral direction.

11. The bending apparatus according to claim 10,
wherein the ram start-up device comprises one of a foot switch and a two-hand controller.

12. The bending apparatus according to claim 11,
wherein the final position of the ram start-up device is saved in a controller when an ON signal is output from the ram start-up device.

13. The bending apparatus according to claim 9,
wherein the ram start-up device comprises one of a foot switch and a two-hand controller.

14. The bending apparatus according to claim 13,
wherein the final position of the ram start-up device is saved in a controller when an ON signal is output from the ram start-up device.

15. The bending apparatus according to claim 9,
wherein the final position of the ram start-up device is saved in a controller when an ON signal is output from the ram start-up device.

16. A bending apparatus for starting a ram to bend a workpiece abutted against abutments of a back gauge, the bending apparatus comprising:
a ram start-up device configured to be movable in a lateral direction;
an abutment point determiner that determines a point of an abutment in the lateral direction based on a bending sequence in which the workpiece is to be bent, at least one of a punch and a die used to bend the workpiece, and a tool layout of the at least one of the punch and the die decided by a worker according to product information; and
a ram start-up device point determiner that determines a point where the ram start-up device is to be actually positioned in the lateral direction within a range of an abutting width procured from at least one abutment based on the point of the abutment in the lateral direction,
wherein the ram comprises at least one of an upper table to which a punch is attached and a lower table to which a die is attached.

17. The bending apparatus of claim 16,
wherein the ram start-up device point determiner determines the actual positioning point as the point of the ram start-up device in the lateral direction, and then saves the determined point in a controller.

* * * * *